(12) United States Patent
Peters et al.

(10) Patent No.: US 9,665,552 B2
(45) Date of Patent: May 30, 2017

(54) FORM LAYOUT METHOD AND SYSTEM

(71) Applicant: Accenture Global Services Limited, Dublin (IE)

(72) Inventors: Jonathan E Peters, Conyers, GA (US); Matthew R Foster, Poplar Grove, IL (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 304 days.

(21) Appl. No.: 14/678,233

(22) Filed: Apr. 3, 2015

(65) Prior Publication Data

US 2015/0278184 A1    Oct. 1, 2015

Related U.S. Application Data

(63) Continuation of application No. 13/436,164, filed on Mar. 30, 2012, now Pat. No. 9,003,279.

(60) Provisional application No. 61/470,439, filed on Mar. 31, 2011.

(51) Int. Cl.
*G06F 17/00* (2006.01)
*G06F 17/24* (2006.01)
*G06F 17/30* (2006.01)
*G06F 17/21* (2006.01)

(52) U.S. Cl.
CPC .......... *G06F 17/243* (2013.01); *G06F 17/218* (2013.01); *G06F 17/3089* (2013.01)

(58) Field of Classification Search
CPC ... G06F 17/3089; G06F 17/211; G06F 17/212
See application file for complete search history.

(56) References Cited

U.S. PATENT DOCUMENTS

| | | | | |
|---|---|---|---|---|
| 5,555,362 A | * | 9/1996 | Yamashita | G06K 9/00463 382/173 |
| 5,694,609 A | * | 12/1997 | Murata | G06F 17/2745 715/210 |
| 5,717,945 A | * | 2/1998 | Tamura | G06F 17/212 715/235 |
| 5,809,266 A | * | 9/1998 | Touma | G06F 17/30554 707/999.004 |
| 5,900,003 A | * | 5/1999 | Ben Dror | G06T 11/60 715/234 |
| 6,081,816 A | * | 6/2000 | Agrawal | G06F 17/211 715/210 |

(Continued)

OTHER PUBLICATIONS

Zheng Junsheng et al., The Research on Web Page Design based on DIV+CSS, Computer Developing and Application, Sep. 2008, 6 pages.

(Continued)

*Primary Examiner* — Laurie Ries
(74) *Attorney, Agent, or Firm* — Brinks Gilson & Lione

(57) ABSTRACT

A form layout system includes a form layout tool that provides a flexible way to lay out forms on a web page. The form layout tool configures a web configuration file with the location of form layout styles, and uses the form layout styles, a number of columns, a number of fields, and a "size" of each field to include in the component of a page layout to create a page layout for a target application. The form layout tool generates a revised application page with the created page layout by applying the form layout style to the created page layout.

16 Claims, 28 Drawing Sheets

(56) References Cited

U.S. PATENT DOCUMENTS

| | | | |
|---|---|---|---|
| 6,178,417 B1* | 1/2001 | Syeda-Mahmood | G06F 17/30707 |
| 7,032,170 B2* | 4/2006 | Poulose ................ | G06F 17/243 |
| | | | 715/222 |
| 7,454,698 B2* | 11/2008 | Kohda .............. | G06F 17/30011 |
| | | | 707/E17.008 |
| 7,505,977 B2* | 3/2009 | Rychener .......... | G06F 17/30893 |
| 2009/0083617 A1* | 3/2009 | Hironiwa .............. | G06F 17/243 |
| | | | 715/222 |

OTHER PUBLICATIONS

Second Office Action issued in Chinese Application No. 201210098780.9 on Mar. 25, 2015, 14 pages.

* cited by examiner

Old Style Page Layout

| Loss Details | | | |
|---|---|---|---|
| * Line of Business: Automobile ▽ | Claim File Status: New | | Claim Type: Auto |
| * Complexity: Medium ▽ | * Claim File Type: Normal ▽ | | * Sensitivity: Standard |
| * Date of Loss: 1/25/2011 | Time of Loss: hh:mm am/pm | | * Currency: USD |
| Date Closed: | Date Reopened: | | Reported By: Carmen R. Greene |
| Date Reported: mm/dd/yyyy | Reported By: <none> ▽ | | |
| Loss Description: ◁ ▷ | | | |
| Analytic Score: | Claims Made Date: mm/dd/yyy | | Fatality Exists: ☐ |
| Company: <none> ▽ | Department: <none> | | |

— 202
— 204
— 200

Yellow = DIV
Green = Table or Table Cell

FIG. 2

RadGrid example

| ID | Name | Product |
|---|---|---|
| PR 00 10 | Product Recall 1 | Middle Market Baked Goods Manufacturing |
| PR 00 11 | Product Recall 2 | Middle Market Glass Goods Manufacturing |
| PR 00 12 | Product Recall 3 | Middle Market Plastics Goods Manufacturing |
| PR 00 13 | Product Recall 4 | Middle Market Rubber Goods Manufacturing |
| PR 00 14 | Product Recall 5 | Middle Market Baked Goods Manufacturing |
| PR 00 15 | Product Recall 6 | Middle Market Glass Goods Manufacturing |
| PR 00 16 | Product Recall 7 | Middle Market Plastics Goods Manufacturing |

Page Title Goes Here

Section 1

Name: New Plastics Offering Displ Testing
ID: MODEL00027
Description: Model Execution for testing of the New Plastics Offering. Includes Product Recall coverage.
Type: New Offering
Created Date: 4/12/2009
Product Group: New Plastics Offering
Crated By: Richard K. Fondsden Section 2
Section 3

Cancel  Save

1900

| ID | Name | Required Product | Required Product | LOB |
|---|---|---|---|---|
| PR 00 10 | Product Recall Coverage Form | Yes | Middle Market Baked Goods Manufacturing | General Liability |
| PR 00 10 | Product Recall Coverage Form | Yes | Middle Market Glass Goods Manufacturing | General Liability |
| PR 00 10 | Product Recall Coverage Form | Yes | Middle Market Plastics Goods Manufacturing | General Liability |
| PR 00 10 | Product Recall Coverage Form | Yes | Middle Market Rubber Goods Manufacturing | General Liability |

Search Preview Table Example

Field Information

Data Type    Valid Value
Description  This field indicates that towing is
             covered under the policy.
Effective Date   09/01/2009
Expiration Date  01/01/2999
Where Used   Policy Information (Policy Details page)

Data Object Information

Name         General Policy
Description  This is an custom data object for a
             custom policy field.

2502 — ISC Style Guide, Version 1.1.0 (20100825)

Form Layout Styles

| Style Sheet | Description | Example |
|---|---|---|
| layout_forms-20-20-20-20-20.css | Use this layout when you want a 5 column form layout. | |
| layout_forms-25-25-25-25.css | Use this layout when you want a 4 column form layout. | |
| layout_forms-30-70.css | Use this layout when you want a 2 column form layout. With this layout, it is expected that the field lable {<p>} is in a .small left column and the field control is in a .medium right column. | ```<div class="formLayout"><br><div class="fullrow"><br><div class="small=><p>Was a machine or tool involved in this accident?</p></div><br><div class="medium"><br><select><br><option delected>Yes</option><br><option>No</option><br></select><br></div><br></div>``` |
| layout_forms-33-33-33.css | Use this layout when you want a 3 column form layout. | |
| layout_forms-50-50.css | Use this layout when you want a 2 column form layout. | |
| layout_forms-50r-50.css | Use this layout when you want a 2 column form layout. With this layout, it is expected that the field lable {<p>} is in a .small left column and the field control is in a .medium right column. | See layout_forms-30-70.css for a coding example |

FIG. 25

FORM LAYOUT METHOD AND SYSTEM

RELATED APPLICATIONS

This is a continuation application of U.S. patent application Ser. No. 13/436,164 filed Mar. 30, 2012, which claims priority to U.S. Provisional Patent Application Ser. No. 61/470,439, filed Mar. 31, 2011, the entirety of both of which are hereby incorporated by reference herein for all purposes.

TECHNICAL FIELD

The present description relates generally to a system, method and computer program product to lay out forms on a web page. More specifically, the present description relates to a flexible form layout approach that greatly facilitates creation of tables used in, as an example, a new theme for a new web page.

BACKGROUND INFORMATION

Web forms have traditionally used nested HTML tables to lay out a form.

A traditional page layout includes seven layers of nested HTML DIV tags (DIVs) and tables to create an area for the form. In some cases, the form includes at least 5 layers of nested DIVs and tables (3 layers of DIVs and at least 2 levels of nested tables), and requires at least 12 layers of nested HTML elements to create the form on the page.

Development of web pages using the traditional page layout is generally straightforward. However, because of the traditional page layout architecture, maintaining web pages can be a time consuming, expensive, and difficult effort. In particular, a page layout with nested HTML tables is slow to render and difficult to maintain (e.g. prone to maintenance errors) because a maintainer needs to understand the nested table structure used on the page.

A need exists to solve this problem and others previously experienced with the nested table structure of HTML tables traditionally used for web forms.

SUMMARY

The form layout system may be implemented in a computer system that includes a computer memory operable to store form layout tool instructions, and a database operable to store a plurality of form layout styles. The form layout system includes a processor in communication with the memory and the database. The processor is operable to receive, by executing the form layout tool instructions, a target application identifier, wherein the target application comprises a plurality of application pages that include components including sections comprising data fields located thereon. The form layout tool instructions configures a web configuration file with the location of the form layout styles, and creates a page layout for the target application from the plurality of pages, using a form layout style from the plurality of form layout styles, and receiving a number of columns, a number of fields, and a "size" of each field to include in the component of the page layout. The form layout tool instructions generate a revised application page with the created page layout by applying the form layout style from the plurality of form layout styles as specified by the created page layout, so that the target application may be executed with the created page layout.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2 shows an illustration of the Old Style Page Layout.

FIG. 14 shows an example of a RadGrid in the columnB groupBox.

FIG. 18 illustrates a lateral list metaphor.

FIG. 19 illustrates an example form used to layout controls on a page.

FIG. 21 illustrates a TABLE.listTable style.

FIG. 22 illustrates a TABLE style.

FIG. 25 illustrates a list of form layouts.

DETAILED DESCRIPTION

Figure 1A:
FIG. 1A shows an illustration of the table based old style page layout.

In relation to the following description, components shown in different drawings with the same reference numerals basically perform the same function. The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

The form layout system may be implemented in a computer system that includes a computer memory operable to store form layout tool instructions, and a database operable to store a plurality of form layout styles. The form layout system includes a processor in communication with the memory and the database. The processor is operable to receive, by executing the form layout tool instructions, a target application identifier, wherein the target application comprises a plurality of application pages that include components including sections comprising data fields located thereon. The form layout tool instructions configures a web configuration file with the location of the form layout styles, and creates a page layout for the target application from the plurality of pages, using a form layout style from the plurality of form layout styles, and receiving a number of columns, a number of fields, and a "size" of each field to include in the component of the page layout. The form layout tool generates a revised application page with the created page layout by applying the form layout style from the plurality of form layout styles as specified by the created page layout, so that the target application may be executed with the created page layout.

Figure 1B:
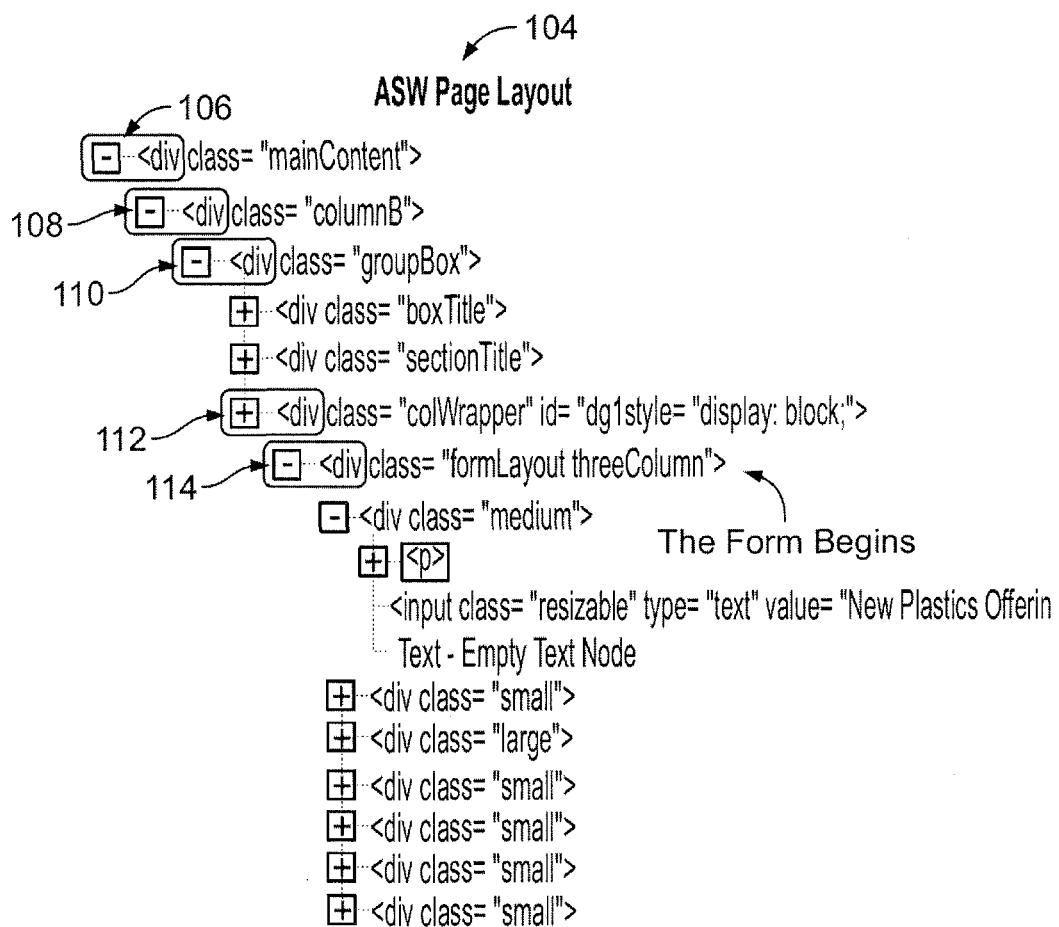
FIG. 1B shows an illustration of the new tableless design layout.

FIG. 1A shows an illustration of the table based old style page layout 102, and FIG. 1B shows an illustration of the new tableless design layout 104. The form layout method and system may use cascading style sheets (CSS) for web sites that externalize the style sheets so that the style sheets can be shared across applications, and provides the mechanisms that allow theming and application level customizations. One benefit of the new tableless layout 104 is that the layout 104 requires as few as half the number of levels of nested page elements (106, 108, 110, 112, 114) over traditional HTML table layouts (116, 118, 120, 122, 124, 126, 128), compare where the form 130 begins using the old style page layout 102 versus where the form 114 begins using the new tableless design layout 104. The form layout method and system uses the CSS box model and styles sheets to size and "float" form fields into position on a web page. The form layout method and system provides styles to support form layouts from 2 to 5 columns in width. Each field may be placed in a DIV with a class of small (1 column), medium (2 columns), or large (up to 3 columns).

A division (DIV) is an html tag that is basically the binding rectangle for anything that goes on the page (i.e. web page or application page) and names for the classes. The styles relate to column A which is the left hand column, column B which is the main site, column C which is a third column on the page for a three column layout. The styles are very specific to the way the pages are constructed, and within the style sheets, the style sheets are very specific as to the styles that may be used on an application page. The form layout tool uses several different layouts. For example, a user web site typically uses application specific styles, but the developer decides that across the board to make all of column Bs for a particular theme purple rather than blue. Accordingly, a specific set of styles related to column B exists that overwrite the images and any specific colors related to that style.

Other implementations with additional or fewer columns may are also possible. At the form level a style is included to indicate the number of columns needed in the form. The widths of the styles include small, medium, and large sizes, and adjust depending on the number of columns needed in the form. Form Layout refers to the imposition or arrangement of fields and controls within a component or a section in a component. The visual layout of a form depends on (a) the number columns in the component, and (b) the "size" of each field. For example, one may consider how the page will render on a 1024 pixel horizontal resolution screen when determining which field sizes to use in a layout. Fields and controls can be laid out within a component in several formats. In the 3-column (33-33-33) form layout each column takes up roughly a third of the available space (after subtraction of the margins). The form layout sets up a framework, but the actual layout depends on the sizes of the fields, which can be specified as Small, Medium, or Large. In "autosize" setting, fields expand to fill available space. In a 3-column format, one row may contain these combinations three Small fields, one Medium and one Small field, or one large field. Fields that do not fit on the same line with the preceding field are automatically pushed to the next line, which can create an awkward display, but in order to prevent illogical groupings, there are overrides: Fields can also be scaled manually (Example Date), and Fields may be kept together in a "paired" set (example Currency). Note that in a larger (80%) component, the standard small, medium and large fields are physically larger than on a normal 60% component. Middle column components may also accept a 2-column (50-50) field layout, which can be useful when the data values are longer. Formats also exist for 4- and 5-column field layouts, which may be available in the 80% and 100% panels.

The new Tableless Design includes 4 layers of nested DIVs to create the area for the form, while the form consists of 2 levels of nested DIVs to layout the form, and includes 6 layers of nested HTML elements to create a form on the page. The new Tableless Design requires half the number of levels of nested page elements. Tableless Web Design use CSS (Cascading Style Sheets) for page layout rather than nested HTML tables. The Advantages of new Tableless Design include reduced complexity of HTML coding patterns, fewer HTML tags, reduced page size, allows layout changes for different devices, supports theming, and improved page maintainability. The Styles Project Organization provides platform and architecture independence, supports multiple versions of styles, supports multiple versions of Telerik® styles. The Styles Configuration includes an ASW.Styles virtual directory of styles located in an addressable location. Developers may create an IIS virtual directory called ASW.Styles that points to the Styles distribution directory. In order to use the form layout, web.config page themes are used to control the theme, customize the application settings, and add dynamic links to CSS. The path to the master set of ASW styles is configured in the web-.config. References to CSS files are dynamically rendered, style related clean-up is performed, and application specific CSS files or images are moved to the approved locations.

FIG. 2 shows an illustration of the prior style (also referred to as the traditional or old style) of page layout 200. One problem with the old style 200 is that the old style 200 is a fixed layout. In order to add, remove, or lengthen a field a developer must find the correct place in the 12 (or more) levels of nested tables (204) and DIVs (202) (each cell in the page is a table or table cell) and correctly edit the HTML code to change the table layout. Correctly editing HTML code, using the old style, is a major maintenance issue and a source for major problems when editing a page. New configuration driven architectures require more flexibility in the layout. On a per customer basis, rules are built for field visibility. With the table based layout 200, a page with visibility rules would end up looking bad because no easy way exists to change the page layout when a field is not displayed for a given user (e.g., reorganizing the tables is complicated). Localization is another layout consideration where the style of layout is a limiting factor, because the page layout has no easy way to change the number of form columns. One reason for wider or fewer columns is if more room for longer field labels and field values are needed for a language such a German where works are typically longer than English. Accordingly, the columns dynamically adapt to the space available.

Figure 3:
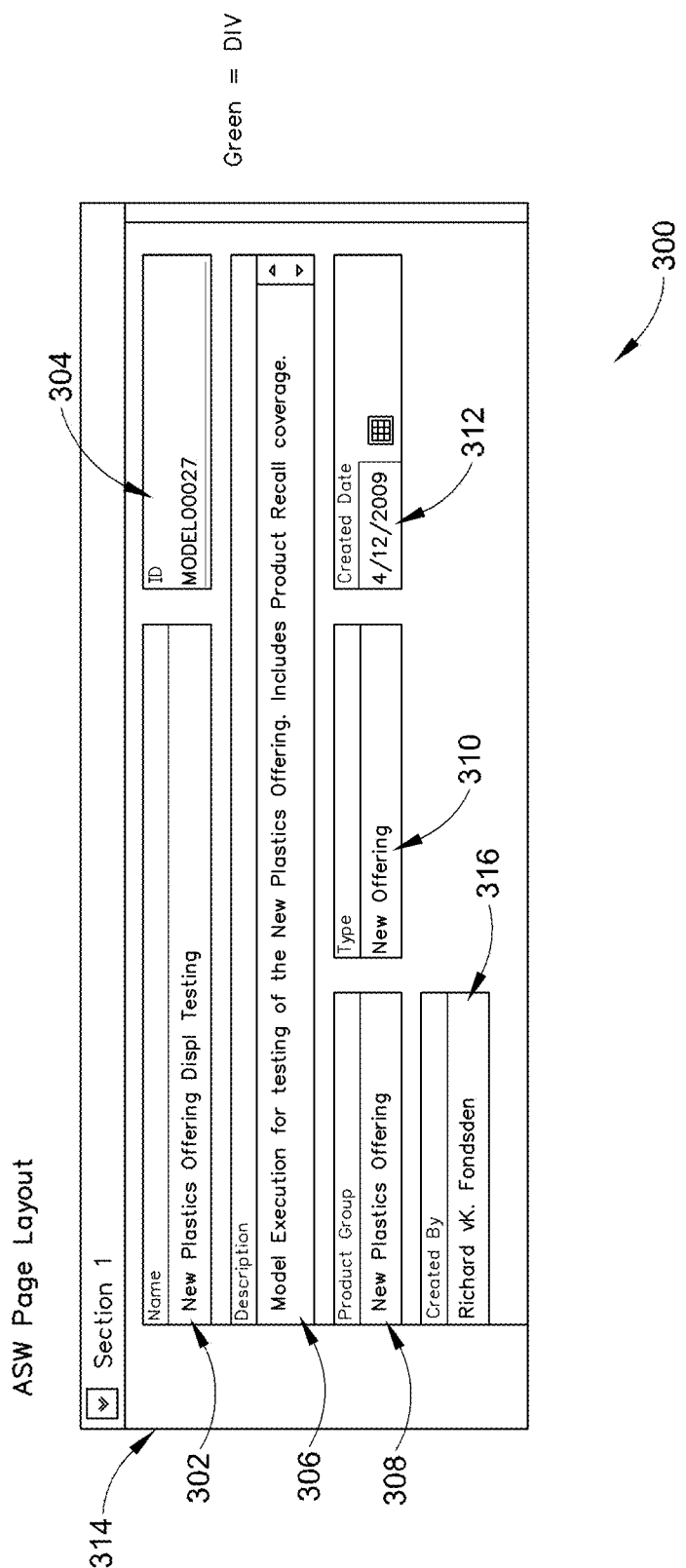
FIG. 3 illustrates a tableless form layout technique.

FIG. 3 illustrates a tableless form layout technique 300. The form layout technique uses DIVs (302, 304, 306 308, 310, 312, 314, 316) that are floated into position, which greatly simplifies the page layout and allows for easy changes to the form. Floating a DIV tag into position may involve formatting the DIV tag using style sheet formatting instructions, e.g. CSS rule ".example {float: left}" may cause DIV tags including the 'class="examplem"' attribute to float to the left of other page elements.

If changes are needed to the number of columns in the form, the style used for the column count is changed. The form layout tool supports forms with 2 to 5 columns. The column count is configurable in the Page Designer tool. No development is needed to make the number of columns change. All form fields are inside a DIV (302, 304, 306 308, 310, 312, 314, 316) of class of small, medium or large. To make a field longer, the DIV is changed to a larger size. Field widths are configurable in the tool. In the table layout the column and row where the field is placed are specified, in the form layout technique the final assembly of the page is dynamic. The fields float into position, and based on the number of columns in the form and the width of the fields, the page automatically assembles. The automatic assembly of the form is helpful in building a page with visibility rules on the fields. If a field is not visible, the styles allow the form to be assembled without gaps and without the need for a programmer to clean up the page layout.

Table 1 illustrates the logic for a three column form layout.

TABLE 1

FormLayout threeColumn

```
<div class="formLayout threeColumn">
    <div class="medium">
        <p>Name</p>
        <input type="text" class="resizable" value="New Plastics
        Offering Displ Testing"/>
    </div>
    <div class="small">
        <p>ID</p>
        <div class="control"><p>MODEL00027</p></div>
    </div>
    <div class="large">
        <p>Description</p>
        <textarea>Model Execution for testing of the New Plastics
Offering. Includes Product Recall coverage.</textarea>
    </div>
    <div class="small">
        <p>Product Group</p>
        <input type="text" class="resizable" value="New Plastics
        Offering"/>
    </div>
    <div class="small">
        <p>Type</p>
        <input type="text" class="resizable" value="New Offering"/>
    </div>
    <div class="small">
        <p>Created Date</p>
        <telerik:RadDatePicker Runat="server" style="width: 100px;"
        SelectedDate="4/12/2009"></telerik:RadDatePicker>
    </div>
```

TABLE 1-continued

FormLayout threeColumn

```
    <div class="small">
        <p>Created By</p>
        <input type="text" class="resizable" value="Richard K.
        Fondsden"/>
    </div>
</div>
```

Figure 4:
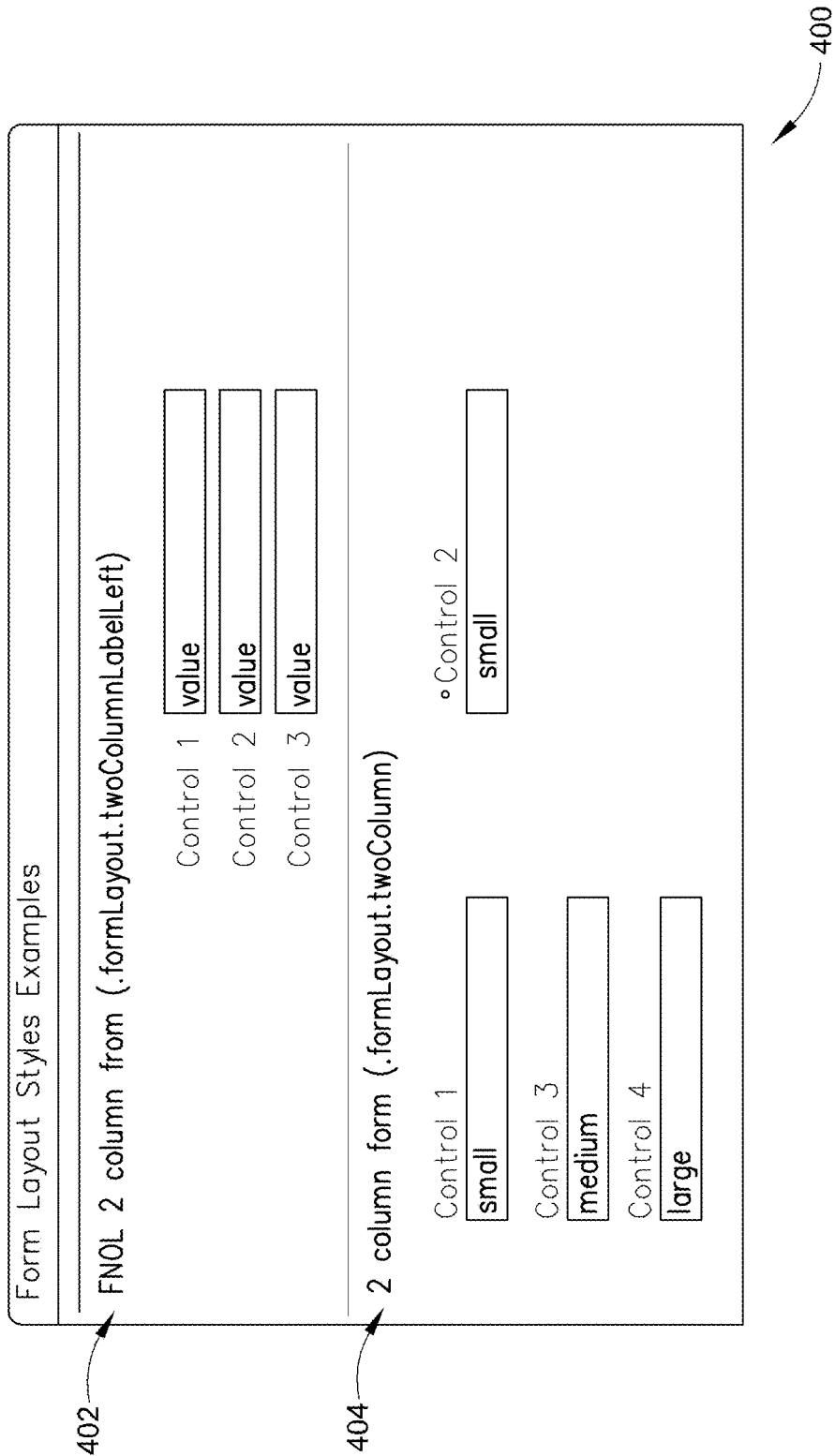
FIG. 4 shows form layout style examples.
Figure 5:
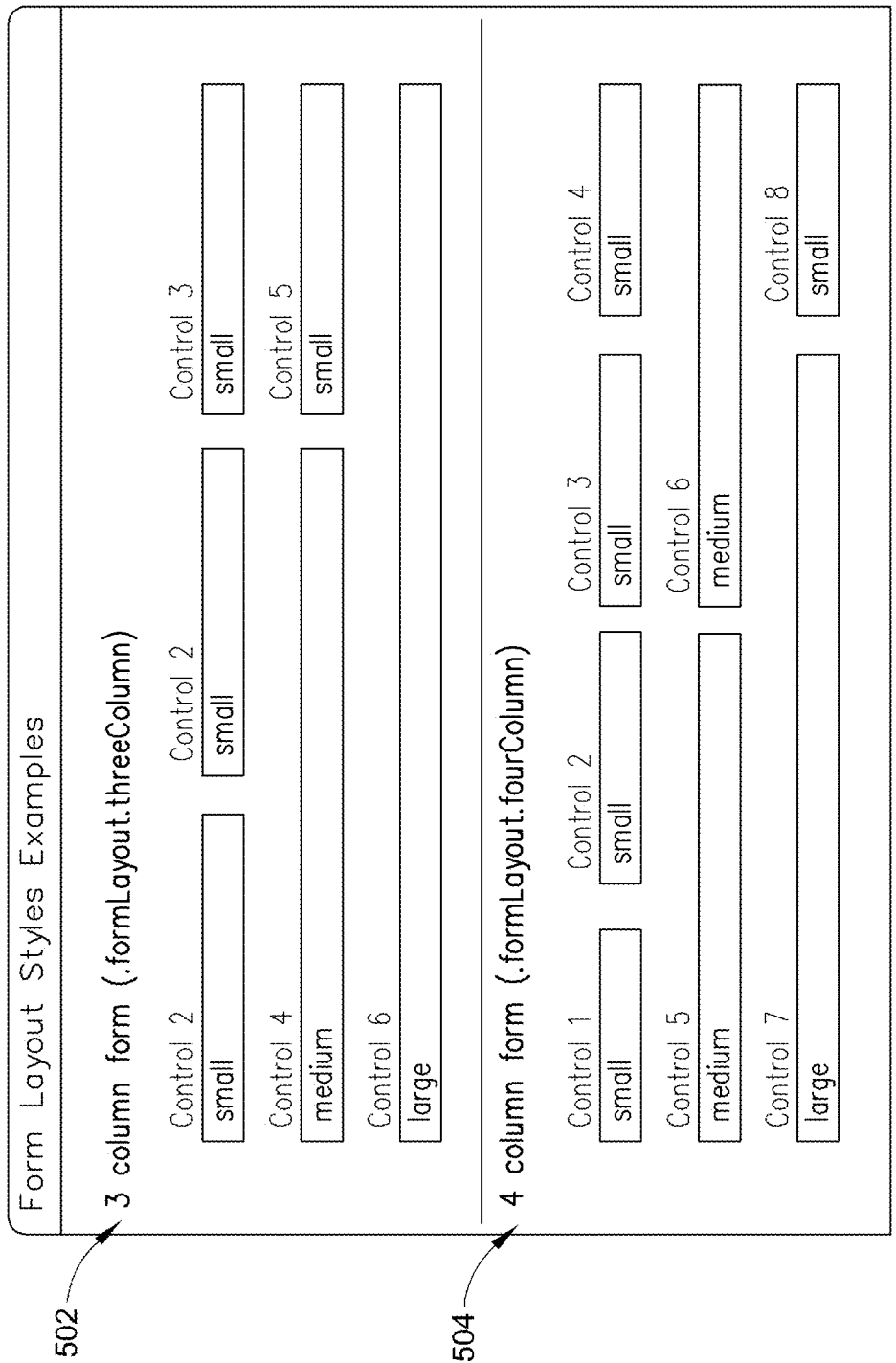
FIG. 5 shows form layout style examples.
Figure 6:
FIG. 6 shows form layout style examples.

FIGS. 4 thru 6 show illustrations of form layout styles examples. Form Layout approach uses the Cascading Style Sheets (CSS) box model and styles sheets to size and "float" form fields into position on a web page. The form layout method system provides styles to support form layouts from 2 to 5 columns in width. Each field is placed in a DIV element with a class of small (1 column), medium (2 columns 402, 404), or large (3 columns 502, 4 columns 504, and 5 columns 602). At the form level a style is included to indicate the number of columns needed in the form. The width of the styles associated with small, medium, and large are adjusted depending on the number of columns needed in the form. One of the most difficult aspects of creating a page without the use of tables is learning how to control the line breaks. CSS is used to simulate a <br/> after the use of an element and remove line breaks that automatically occur with some elements (e.g., headers, list elements, paragraphs, etc). The html coding pattern and style sheets were developed so that the sheets may be applied broadly, across several applications to impose a consistent look and fields shareable between applications, the coding patterns and style sheets that crop all the applications as new themes are developed, new looks of available sites, the new looks can be applied across the application suites without additional coding for the application.

Table 2 illustrates preparing an application to use application software (ASW) Styles, where the style settings are added to the web.config file.

TABLE 2

Add new appSettings for stylesDir, standardThemeNames, and Telerik.Styles.Version

```
<appSettings>
    add key="Telerik.Skin" value="Default"/>
    add key="Telerik.EnableEmbeddedSkins" value="false"/>
    add key="Telerik.EnableEmbeddedBaseStylesheet" value="false"/>
    add key="stylesDir"
    value="http://localhost/ASW.Styles/styles.1.1.0/" />
    add key="standardThemeNames"
value="BlueBerry,BlueBerryHighContrast,Cucumber,Grape,Tomato"/>
    add key="Telerik.Styles.Version" value="2010.1.519">
</appSettings>
```

Table 3 illustrates logic to reference an example master page.

TABLE 3

/common/master.master

```
<head runat="server">
    <title><asp:ContentPlaceHolder ID="pageTitleMaster"
runat="server"></asp:ContentPlaceHolder></title>
    <asp:Literal ID="ltrMasterStyleSheetIncludes" runat="server" />
    <asp:ContentPlaceHolder ID="pageStylesMaster"
```

TABLE 3-continued

/common/master.master

```
runat="server"></asp:ContentPlaceHolder>
    <script language="JavaScript" src='<asp:Literal ID="ltrScriptsPath"
runat="server" />scripts.js' type="text/javascript"></script>
</head>
```

Figure 7:
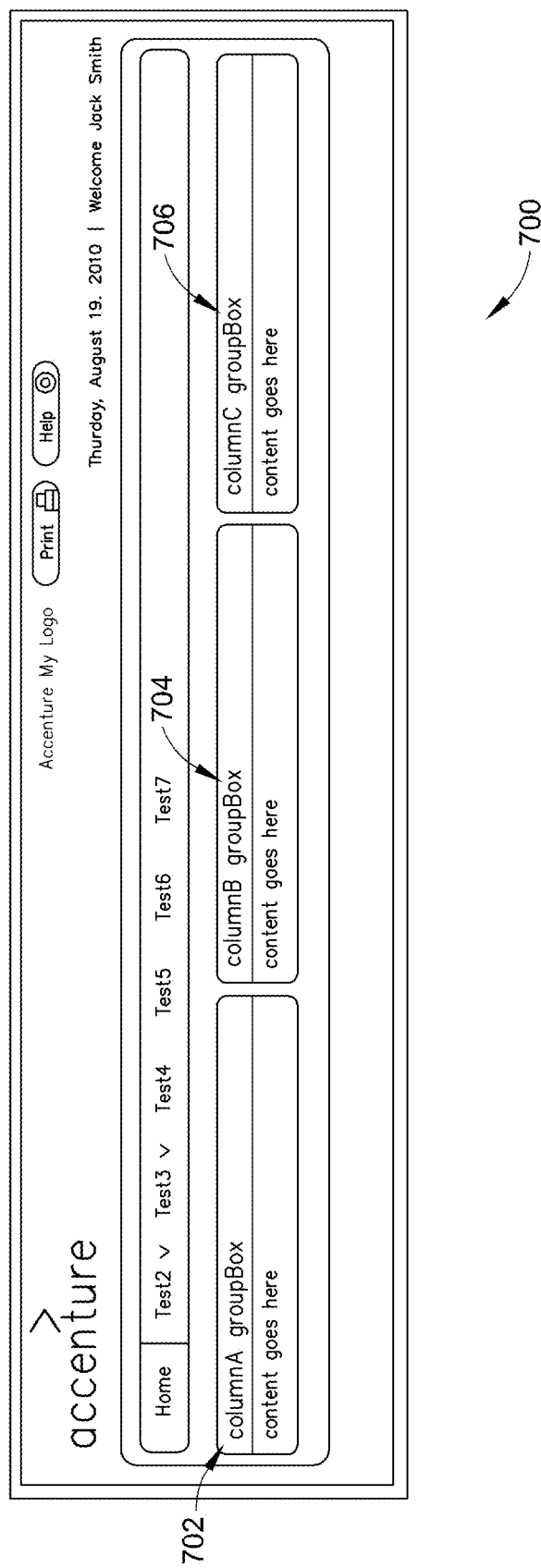
FIG. 7 illustrates an example Default.aspx in the browser.

FIG. 7 illustrates an example Default.aspx in the browser. FIG. 7 shows a columnA 702, columnB 704, and columnC 706 layout.

Figure 8:
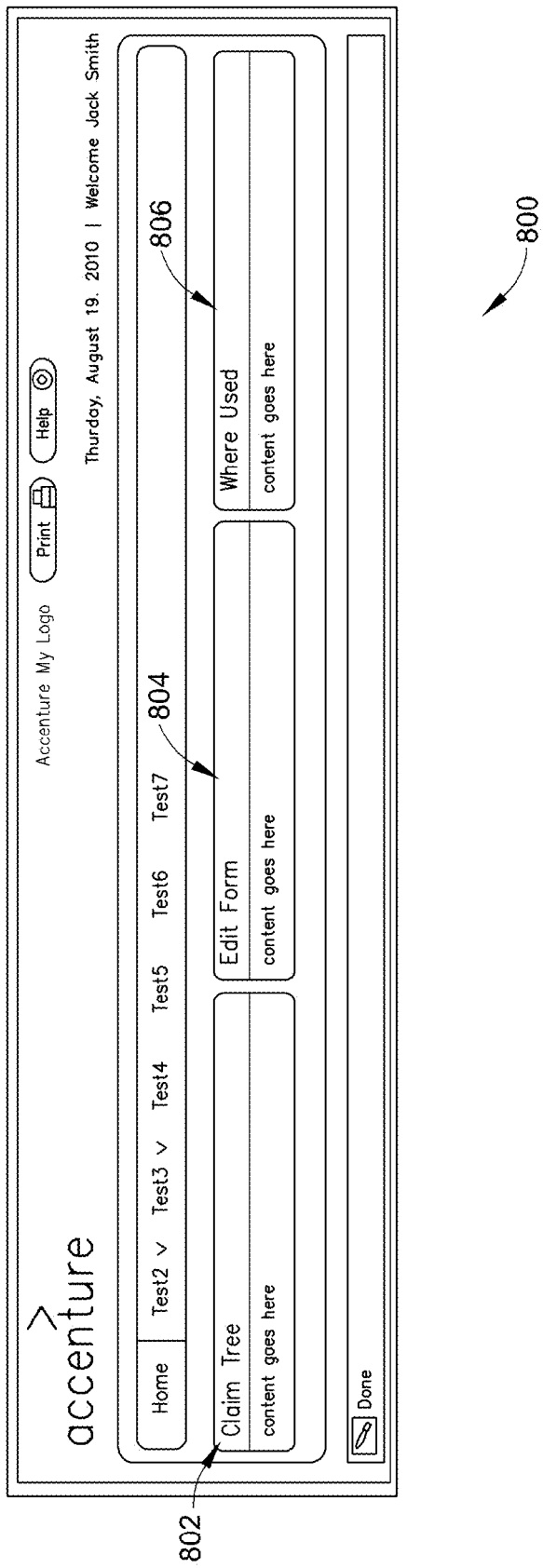
FIG. 8 illustrates an example page called labPage in the pages folder.

FIG. 8 illustrates an example page called labPage in the pages folder. FIG. 8 shows a 'claim tree' 802, 'edit form' 804, and 'where used' 806 columns.

Table 4 illustrates example logic for creating 3 columns using the standard 20-60-20 column layout.

TABLE 4

Create 3 columns using the standard 20-60-20 column layout

```
<%@ Page Language="C#" AutoEventWireup="false"
MasterPageFile="~/common/training.master" %>
<%@ Register TagPrefix="page" TagName="header" Src="~/pages/includes/header.ascx"
%>
<asp:Content ContentPlaceHolderID="pageTitle" Runat="Server">Lab Page</asp:Content>
<asp:Content ContentPlaceHolderID="pageStyles" Runat="Server">
    <!-- PAGE STYLES -->
    <style type="text/css" media="screen,print">@import
"<%=ConfigurationManager.AppSettings.Get("stylesDir")%>layouts/sections/layout_sections-
20-60-20.css";</style>
</asp:Content>
<asp:Content ContentPlaceHolderID="header" Runat="Server">

</asp:Content>
<asp:Content ContentPlaceHolderID="mainContent" Runat="Server">
    <div class="columnA">
        <!-- BEGIN CLAIM TREE -->
        <div class="groupBox">
            <div class="boxTitle">
                <div class='cornerTopLeft'></div><div class='cornerTopRight'></div>
                <p>Claim Tree</p>
            </div>
        <p>content goes here</p>
    <div class='groupBoxFooter'><div class='groupBoxFooterLeftImg'></div><div class='groupBoxFooterRightImg'></div></div>
        </div>
        <!-- END CLAIM TREE -->
    </div>
    <div class="columnB">
        <!-- BEGIN FORM -->
        <div class="groupBox">
            <div class="boxTitle">
                <div class='cornerTopLeft'></div><div class='cornerTopRight'></div>
                <p>Edit Form</p>
            </div>
            <p>content goes here</p>
    <div class='groupBoxFooter'><div class='groupBoxFooterLeftImg'></div><div class='groupBoxFooterRightImg'></div></div>
        </div>
        <!-- END FORM -->
    </div>
    <div class="columnC">
        <!-- BEGIN WHERE USED -->
        <div class="groupBox">
            <div class="boxTitle">
                <div class='cornerTopLeft'></div><div class='cornerTopRight'></div>
                <p>Where Used</p>
            </div>
            <p>content goes here</p>
    <div class='groupBoxFooter'><div class='groupBoxFooterLeftImg'></div><div class='groupBoxFooterRightImg'></div></div>
        </div>
        <!-- END WHERE USED -->
    </div>
</asp:Content>
```

Figure 9:
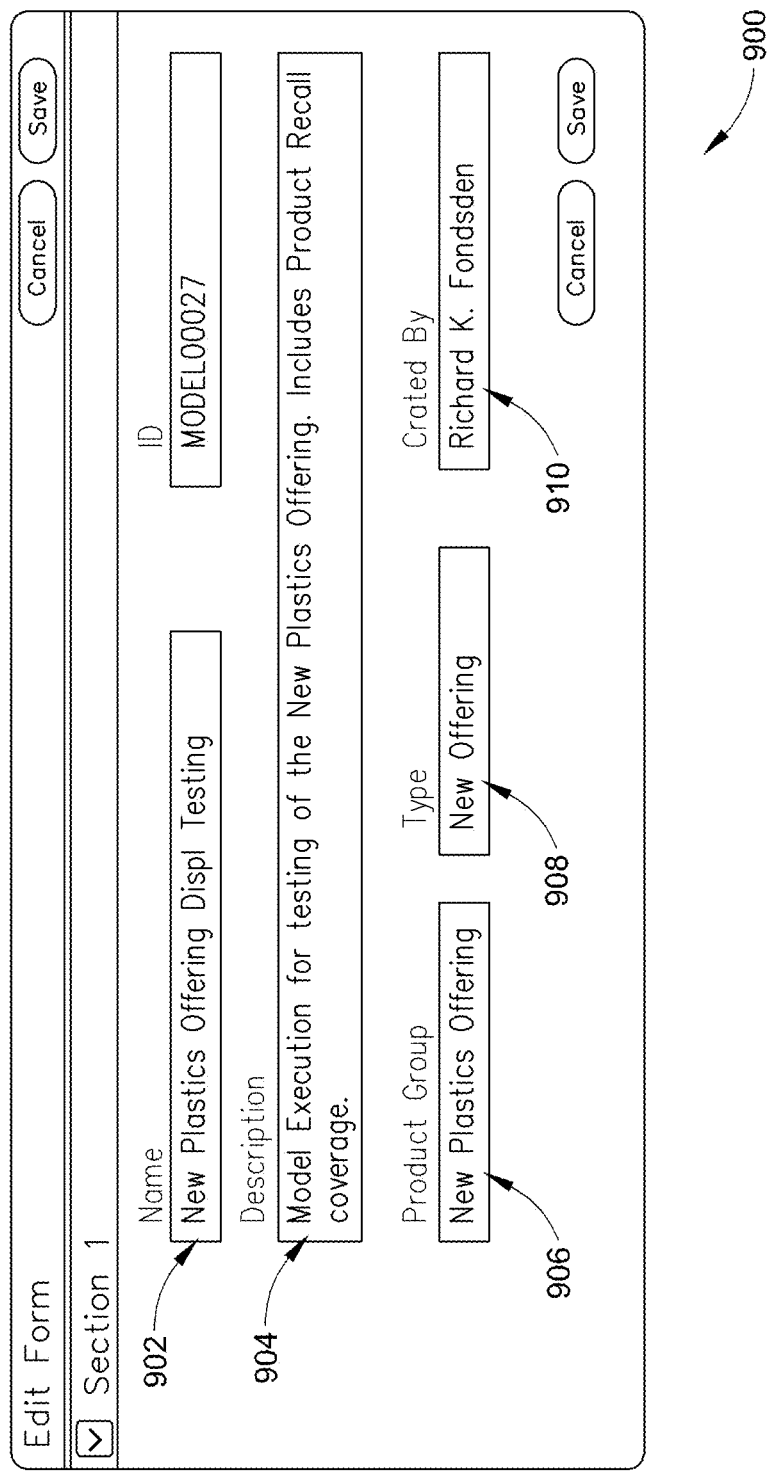
FIG. 9 illustrates an example form.

FIG. 9 illustrates an example form 900 of multiple rows (902, 904, 906) and varying columns (906, 908, 910) used in each row.

Table 5 illustrates logic to add a divider along with 'Save' and 'Cancel' buttons.

TABLE 5

Create a form

```
<!-- BEGIN FORM -->
<div class="groupBox">
        <div class="boxTitle">
                <div class='cornerTopLeft'></div><div class='cornerTopRight'></div>
                        <div class="buttonClear_topRight">
                                <div class="buttonBlueOnBlue"><a href="#">Cancel</a><div class='rightImg'></div></div>
                                <div class="buttonBlueOnBlue"><a href="#">Save</a><div class='rightImg'></div></div>
                        </div>
                <p>Edit Form</p>
        </div>
        <div class="sectionTitle">
                <div class="toggleImageOpen" title="Hide Section" id="dg1Img"
                        onclick="toggleSection('dg1');"></div>
        <span>Section 1</span>
        </div>
        <div class="colWrapper" id="dg1" style="display: block;">
                <div class="formLayout threeColumn">
                        <div class="medium">
                                <p>Name</p>
                                <input type="text" class="resizable" value="New Plastics Offering Displ Testing">
                        </div>
                        <div class="small">
                                <p>ID</p>
                                <div class="control"><p>MODEL00027</p></div>
                        </div>
                        <div class="large">
                                <p>Description</p>
                                <textarea>Model Execution for testing of the New Plastics Offering. Includes Product Recall coverage.</textarea>
                        </div>
                        <div class="small">
                                <p>Product Group</p>
                                <input type="text" class="resizable" value="New Plastics Offering">
                        </div>
                        <div class="small">
                                <p>Type</p>
                                <input type="text" class="resizable" value="New Offering">
                        </div>
                        <div class="small">
                                <p>Created By</p>
                                <input type="text" class="resizable" value="Richard K. Fondsden">
                        </div>
                </div>
        </div>
    <div class="divider"> </div>
        <div class="buttonClear_bottomRight">
                <div class="buttonBlueOnWhite"><a href="#">Save</a><div class='rightImg'></div></div>
                <div class="buttonBlueOnWhite"><a href="#">Cancel</a><div class='rightImg'></div></div>
        </div>
    <div class='groupBoxFooter'><div class='groupBoxFooterLeftImg'></div>
                <div class='groupBoxFooterRightImg'></div></div>
</div>
<!-- END FORM -->
```

Figure 10:
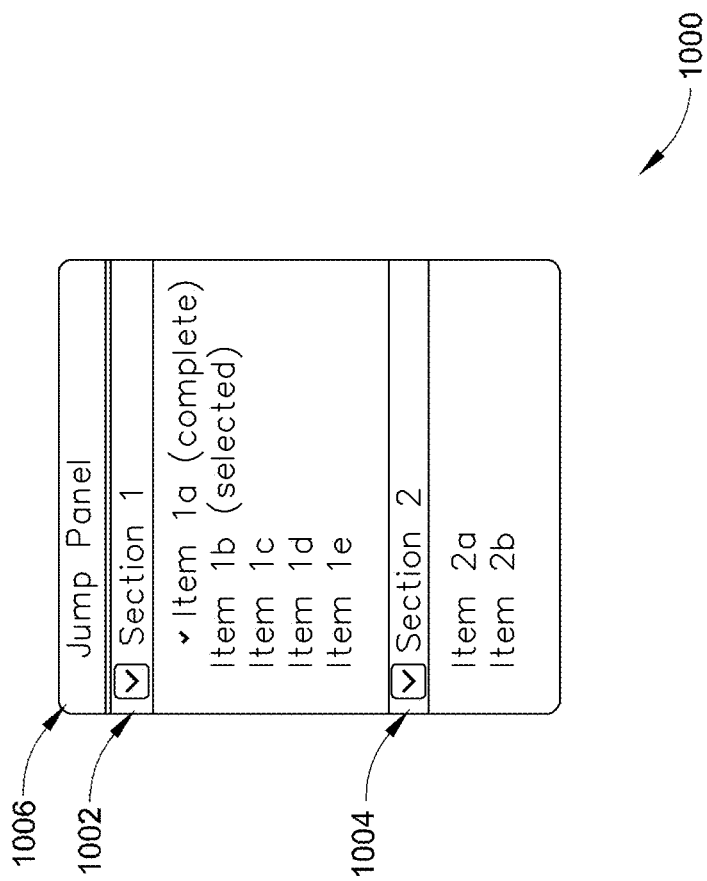
FIG. 10 Use sections and listContainers to create the following Jump Panel.

FIG. 10 illustrates the use sections and listContainers 1002, 1004 used to create a Jump Panel 1006. 'Section 2' defaults as a closed section in the Jump Panel.

Table 6 illustrates logic to code a Jump Panel groupBox in columnA.

TABLE 6 a Jump Panel groupBox in columnA

```
<!-- BEGIN JUMP PANEL -->
<div class="groupBox">
    <div class="boxTitle">
        <div class='cornerTopLeft'></div><div
        class='cornerTopRight'></div>
        <p>Jump Panel</p>
    </div>
    <div class="sectionTitle">
        <div class="toggleImageOpen" title="Show Section"
        id="sec1Img"
            onclick="toggleSection('sec1');"></div>
        <span>Section 1</span>
    </div>
    <div id="sec1" class="colWrapper" style="display: block;">
        <div class="listContainer">
            <ul>
                <li class="complete">
                    <div class='icon_item_completed'></div>
                    <a href="#">Item 1a (complete)</a>
                </li>
                <li class="selected"><a href="#">Item 1b
                (selected)</a> </li>
                <li><a href="#">Item 1c</a></li>
                <li><a href="#">Item 1d</a></li>
                <li><a href="#">Item 1e</a></li>
            </ul>
        </div>
    </div>
    <div class="sectionTitle">
        <div class="toggleImageClosed" title="Hide Section"
        id="sec2Img"
            onclick="toggleSection('sec2');">
        </div>
        <span>Section 2</span>
    </div>
    <div id="sec2" class="colWrapper" style="display: none;">
        <div class="listContainer">
            <ul>
                <li><a href="#">Item 2a</a></li>
                <li><a href="#">Item 2b</a></li>
            </ul>
        </div>
    </div>
```

TABLE 6-continued a Jump Panel groupBox in columnA

```
    <div class='groupBoxFooter'><div
    class='groupBoxFooterLeftImg'></div>
        <div class='groupBoxFooterRightImg'></div></div>
</div>
<!-- END JUMP PANEL -->
```

Figure 11:
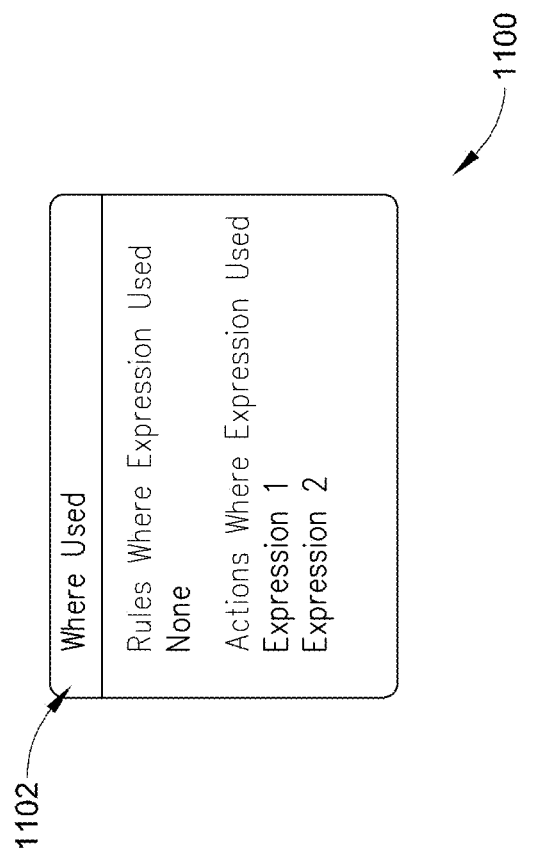
FIG. 11 illustrates a use formLayout and listContainers to create the layout.

FIG. 11 illustrates a use formLayout 1100 and listContainers 1102 to create the layout.

Table 7 shows example logic to create a 'Where Used' groupBox in columnC.

TABLE 7

Create a 'Where Used' groupBox in columnC

```
<!-- BEGIN WHERE USED -->
<div class="groupBox">
    <div class="boxTitle">
        <div class='cornerTopLeft'></div><div
        class='cornerTopRight'></div>
        <p>Where Used</p>
    </div>
    <div class="formLayout threeColumn noBottomMargin">
        <div class="large">
            <p>Rules Where Expression Used</p>
            <div class="listContainer">
                <ul>
                    <li>None</li>
                </ul>
            </div>
        </div>
        <div class="large">
            <p>Actions Where Expression Used</p>
            <div class="listContainer">
                <ul>
                    <li><a href="#">Expression 1</a></li>
                    <li><a href="#">Expression 2</a></li>
                </ul>
            </div>
        </div>
    </div>
    <div class='groupBoxFooter'><div
    class='groupBoxFooterLeftImg'></div><div
class='groupBoxFooterRightImg'></div></div>
</div>
<!-- END WHERE USED -->
```

Figure 12:
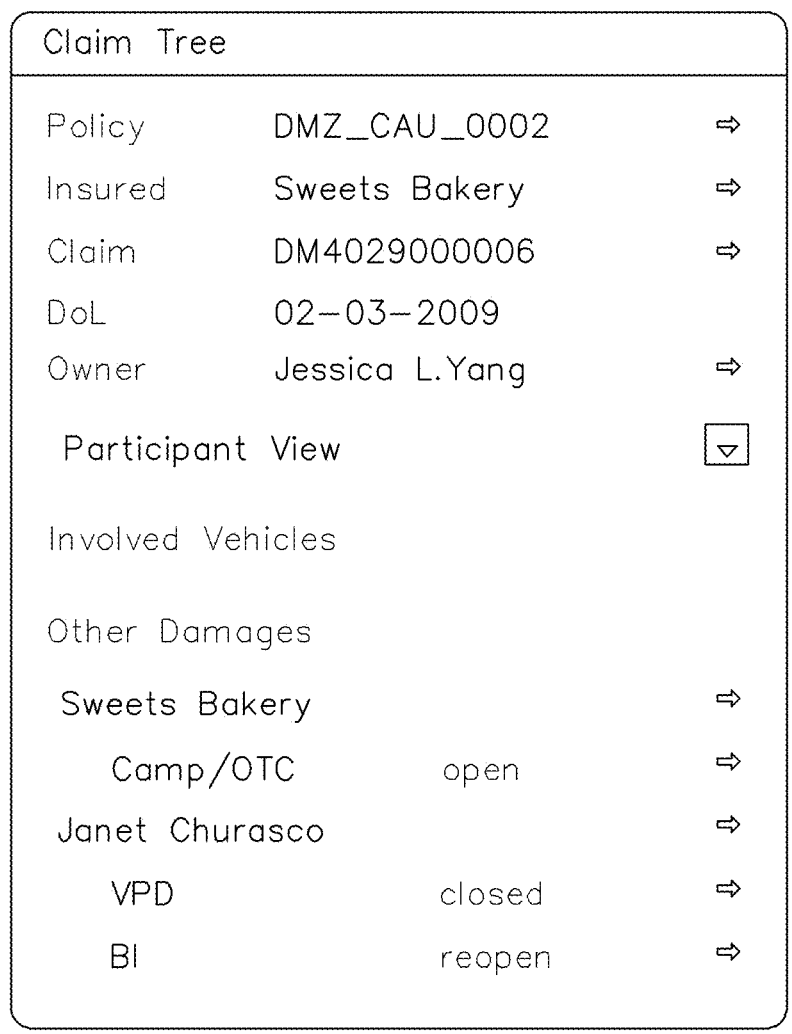
FIG. 12 shows an example 'Claim Tree' groupBox.

FIG. 12 shows an example 'Claim Tree' groupBox 1200. Table 8 illustrates logic to create a 'Claim Tree' groupBox. A groupBox is added at the top of columnA and an actionTable is used to create the Claim Tree.

Table 8 - Create a 'Claim Tree' groupBox in columnA

```
<!-- BEGIN CLAIM TREE -->
<div class="groupBox">
    <div class="boxTitle">
        <div class='cornerTopLeft'></div><div class='cornerTopRight'></div>
        <p>Claim Tree</p>
    </div>
    <table class="actionTable" cellspacing="4px" summary="">
        <tr>
            <td width="30%" class="normal">Policy</td>
            <td class="shadedRow"><a href="#">DMZ_CAU_0002</a></td>
            <td width="2%" class="shadedRow" align="center"><div
class="menuIcon"></div></td>
        </tr>
        <tr>
            <td class="normal">Insured</td>
            <td class="shadedRow"><a href="#">Sweets Bakery</a></td>
            <td class="shadedRow" align="center"><div class="menuIcon"></div></td>
        </tr>
        <tr>
```

Table 8 - Create a 'Claim Tree' groupBox in columnA

```
                <td class="normal">Claim</td>
                <td class="shadedRow_selected"><a href="#">DM4029000006</a></td>
                <td class="shadedRow_selected" align="center"><div
class="menuIcon"></div></td>
            </tr>
            <tr>
                <td class="normal">DoL</td>
                <td colspan="2" style="padding-left: 5px;">02-03-2009</td>
            </tr>
            <tr>
                <td class="normal">Owner</td>
                <td class="shadedRow"><a href="#">Jessica L.Yang</a></td>
                <td class="shadedRow" align="center"><div class="menuIcon"></div></td>
            </tr>
            <tr>
                <td colspan="3" height="28px" vertical-align="bottom">
                    <select id="Select1" style="width: 100%;">
                        <option>Participant View</option>
                    </select>
                </td>
            </tr>
            <tr><td class="titleRow" colspan="3">Involved Vehicles</td></tr>
            <tr><td class="titleRow" colspan="3">Other Damages</td></tr>
            <tr>
                <td class="shadedRow" colspan="2">Sweets Bakery</td>
                <td class="shadedRow" align="center"><div class="menuIcon"></div></td>
            </tr>
            <tr>
                <td class="shadedRow" colspan="2" style="padding:0px;" vertical-
align="middle">
                    <table width="90%" border="0" align="right" cellpadding="0" cellspacing="0"
style="padding:0px;padding-right:5px;" summary="">
                        <tr>
                            <td width="60%">Comp/OTC</td>
                            <td width="40%" class="normal">open</td>
                        </tr>
                    </table>
                </td>
                <td class="shadedRow" align="center"><div class="menuIcon"></div></td>
            </tr>
            <tr>
                <td class="shadedRow" colspan="2">Janet Churasco</td>
                <td class="shadedRow" align="center"><div class="menuIcon"></div></td>
            </tr>
            <tr>
                <td class="shadedRow" colspan="2" style="padding:0px;" vertical-
align="middle">
                    <table width="90%" border="0" align="right" cellpadding="0" cellspacing="0"
style="padding:0px;padding-right:5px;" summary="">
                        <tr>
                            <td width="60%">VPD</td>
                            <td width="40%" class="normal">closed</td>
                        </tr>
                    </table>
                </td>
                <td class="shadedRow" align="center"><div class="menuIcon"></div></td>
            </tr>
            <tr>
                <td class="shadedRow" colspan="2" style="padding:0px;" vertical-
align="middle">
                    <table width="90%" border="0" align="right" cellpadding="0" cellspacing="0"
style="padding:0px;padding-right:5px;" summary="">
                        <tr>
                            <td width="60%">BI</td>
                            <td width="40%" class="normal">reopen</td>
                        </tr>
                    </table>
                </td>
                <td class="shadedRow" align="center"><div class="menuIcon"></div></td>
            </tr>
        </table>
    <div class='groupBoxFooter'><div class='groupBoxFooterLeftImg'></div><div
class='groupBoxFooterRightImg'></div></div>
</div>
<!-- END CLAIM TREE -->
```

Figure 13:
FIG. 13 shows an example of a listTable in the columnB groupBox.

FIG. 13 shows an example of a listTable in the columnB groupBox 1300.

Table 9 illustrates logic of how to add a listTable in the columnB groupBox, and create a three column table, and set one of the rows to displays as a selected row.

TABLE 9

Add a listTable in the columnB groupBox

```
<div class="sectionTitle">
    <div class="toggleImageOpen" title="Hide Section" id="dg2Img"
onclick="toggleSection('dg2');"></div>
    <span>Section 2</span>
</div>
<div class="colWrapper" id="dg2" style="display: block;">
    <div class="titleColumn"><p>listTable example</p></div>
    <table class="listTable" cellpadding="0" cellspacing="0" border="0"
style="padding-bottom: 10px;">
        <tr>
            <th width="15%"><div>ID</div></th>
            <th width="30%"><div>Name</div></th>
            <th width="55%"><div>Product</div></th>
        </tr>
        <tr>
            <td><a href="#">PR 00 10</a></td>
            <td>Product Recall 1</td>
            <td>Middle Market Baked Goods Manufacturing</td>
        </tr>
        <tr>
            <td><a href="#">PR 00 11</a></td>
            <td>Product Recall 2</td>
            <td>Middle Market Glass Goods Manufacturing</td>
        </tr>
        <tr class="selected">
            <td><a href="#">PR 00 12</a></td>
            <td>Product Recall 3</td>
            <td>Middle Market Plastics Goods Manufacturing</td>
        </tr>
        <tr>
            <td><a href="#">PR 00 13</a></td>
            <td>Product Recall 4</td>
            <td>Middle Market Rubber Goods Manufacturing</td>
        </tr>
    </table>
</div>
```

FIG. 14 shows an example of a RadGrid in the columnB groupBox 1400.

Table 10 illustrates a RadGrid added in the columnB groupBox, a titleColumn added below the table, name the titleColumn 'RadGrid example'. The data source for the RadGrid is an XML file (/pages/xml/basicGridData.xml).

TABLE 10

RadGrid in the columnB

```
<div class="titleColumn"><p>RadGrid example</p></div>
<asp:XmlDataSource ID="basicGridData" runat="server"
DataFile="xml/basicGridData.xml" />
<telerik:RadGrid ID="basicGrid" DataSourceID="basicGridData"
runat="server" AllowSorting="True">
    <MasterTableView DataKeyNames="id" runat="server"
GridLines="None">
        <Columns>
            <telerik:GridBoundColumn UniqueName="id"
                DataField="id" HeaderText="ID"
                HeaderButtonType="None" ItemStyle-Width="15%"
HeaderStyle-Width="15%">
            </telerik:GridBoundColumn>
            <telerik:GridBoundColumn UniqueName="name"
DataField="name" HeaderText="Name"
                HeaderButtonType="None" ItemStyle-Width="30%"
HeaderStyle-Width="30%">
            </telerik:GridBoundColumn>
            <telerik:GridTemplateColumn HeaderText="Product"
            HeaderButtonType="None"
```

TABLE 10-continued

RadGrid in the columnB

```
                UniqueName="product" ItemStyle-Width="55%"
            HeaderStyle-Width="55%">
                <ItemTemplate>
                    <div class="threeline">
                        <asp:Label ID="product"
Text='<%#Bind("product") %>' runat="server"></asp:Label>
                    </div>
                    <telerik:RadToolTip ID="RadToolTip1"
runat="server" TargetControlID="product">
                        <%#DataBinder.Eval(Container,
                        "DataItem.product") %>
                    </telerik:RadToolTip>
                </ItemTemplate>
            </telerik:GridTemplateColumn>
        </Columns>
    </MasterTableView>
</telerik:RadGrid>
```

Figure 15:
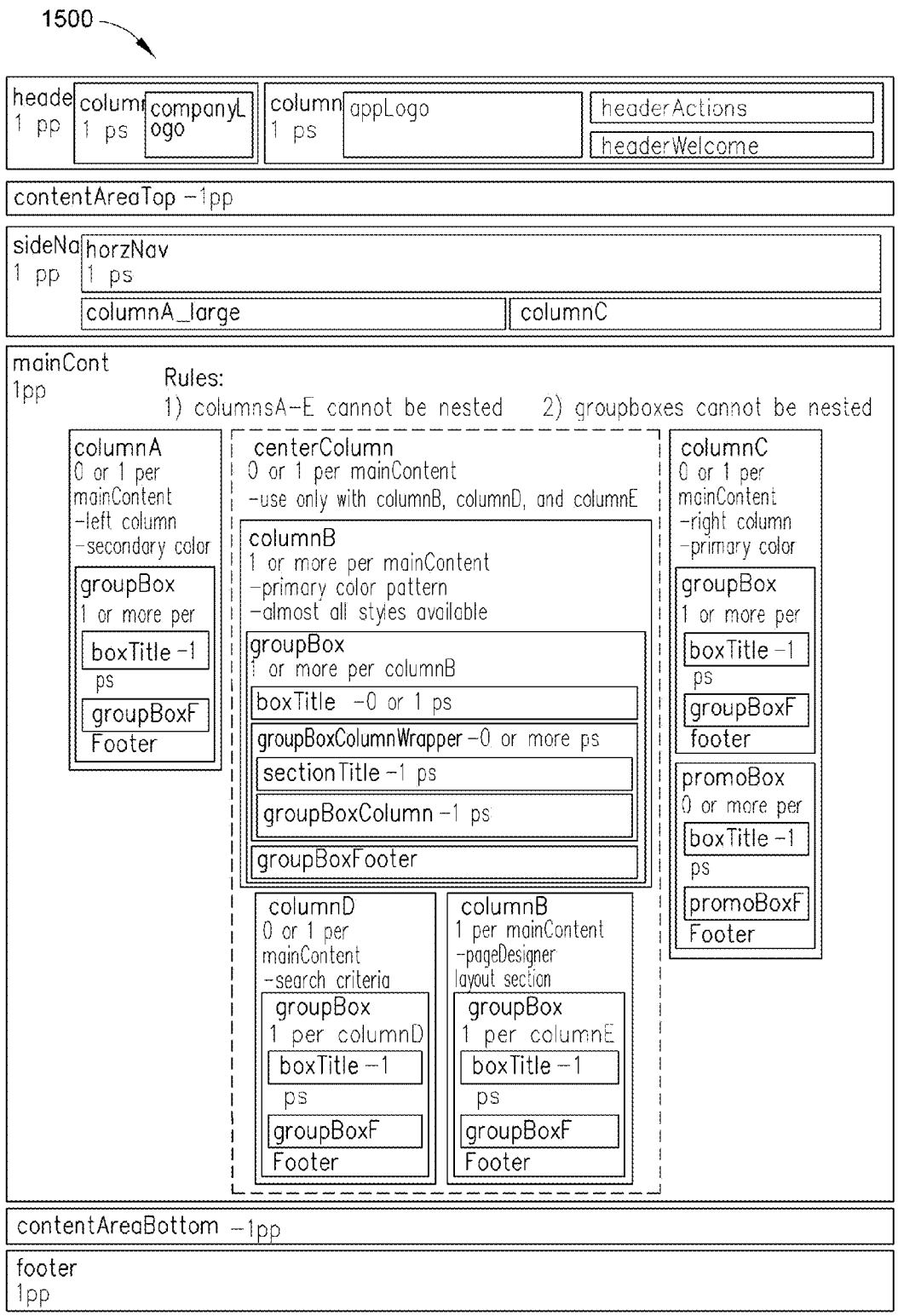
FIG. 15 illustrates the Basic Page Layout.

FIG. 15 illustrates the Basic Page Layout 1500. The basic page layout 1500 includes page Sections, Header, Content Area Top, Site Nav, Main Content Area, Columns, Group Box, Content Area Bottom, and Footer.

Table 11 illustrates example logic for Group Box Styles.

TABLE 11

Group Box Styles

```
<div class="groupBox">
    <div class="boxTitle">
        <div class='cornerTopLeft'></div><div
        class='cornerTopRight'></div>
        <p>Title goes here</p>
    </div>
    --content goes here—
    <div class='groupBoxFooter'>
            <div class='groupBoxFooterLeftImg'></div>
            <div class='groupBoxFooterRightImg'></div>
    </div>
</div>
```

An application uses a single application master CSS. The master CSS contains styles that apply across multiple pages. Located in a folder named "styles" that is a child of a root folder for the application (e.g., /<myapp>/styles). Images may be located in the /myapp/styles/images folder. Multiple images may be combined into sprites. Every image includes an associated style. Pages use the style rather than reference an image directly. Page styles are applied to a single page. The page styles may be placed in the pageStyles asp:Content section of the page.

Table 12 illustrates example pageStyles asp:Content section of the page.

TABLE 12

Example pageStyles asp:Content section of the page

```
<asp:Content ID="Content2" ContentPlaceHolderID="pageStyles"
runat="Server">
    <style type="text/css" media="screen,print">
        @import
"<%=ConfigurationManager.AppSettings.Get("stylesDir")%>layouts/sections/l
ayout_sections-20-80.css";
    </style>
            <style media="screen,print" type="text/css">
                .msgPanel {
                    position: absolute;
                    z-index: 2000;
                }
            </style>
</asp:Content>
```

Optionally, inline styles may be avoided where possible, although sometimes required. The developer may determine whether the style should remain inline, become a page style, or whether to add the style to the application master CSS. Using inline styles prevents the use of CSS styles due to style precedent rules. Example: <td style="padding-left: 10px; font-size: 14px;">2 package(s)</td>. When an application includes items that change looks on a per theme basis, there may be an application theme CSS for every theme (e.g., <app name>.<theme name>.css for Claims.BlueBerry.css). The theme CSS contains overrides for only those style elements that change on a per theme basis. An application theme CSS exists in each of the theme folders (e.g., /App_Themes/<theme name>). Images may be located in the /App_Themes/<theme name>/images folder.

Figure 16:
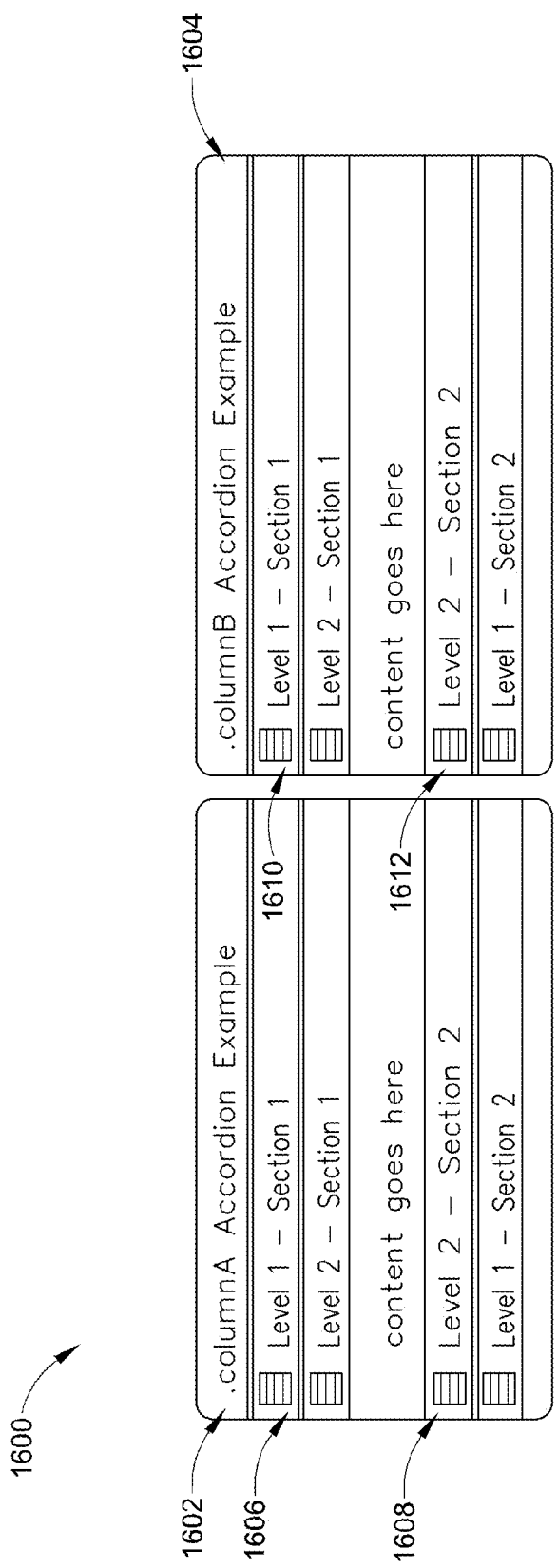
FIG. 16 shows example accordion styles used in the left or right columns where vertical space is limited.

FIG. 16 shows example accordion styles 1600 used in the left 1602 or right 1604 columns where vertical space is limited. Accordions, Sections, Title Column—Accordions, Sections and Title Columns are used to organize page content and may only be used inside a groupBox. Accordion styles are used on pages with Forms to group similar controls. Accordions (1602, 1604) and Sections (1606, 1608, 1610, 1612) are collapsible areas of the page. Accordions allow a single area open at a time. Sections allow multiple sections to be open at a time. The style support up to 2 levels (primary and secondary) of nested accordions/sections. Title Columns are used to group similar controls within the same section or accordion.

Table 13 illustrates logic for example Accordion Style.

TABLE 13

Accordion Styles

```
<div class="accordionTitle" onclick="openColA1 =
accordian(openColA1,
'colA1'); return false;">
    <div class="toggleImageOpen" title="Hide Section"
id="colA1Img"></div>
    <span>Level 1 - Section 1</span>
</div>
<div id="colA1" class="colWrapper" style="display:block;">
    <div class="accordionTitle2" onclick="openColA1_1 =
accordian(openColA1_1, 'colA1_1'); return false;">
        <div class="toggleImageOpen" title="Hide Section"
id="colA1_1Img"></div>
        <span>Level 2 - Section 1</span>
    </div>
    <div id="colA1_1" class="colWrapper" style="display:block;">
        <div class="listContainer"><ul><li>content goes
```

TABLE 13-continued

Accordion Styles

```
here</li></ul></div>
    </div>
</div>
```

Figure 17:
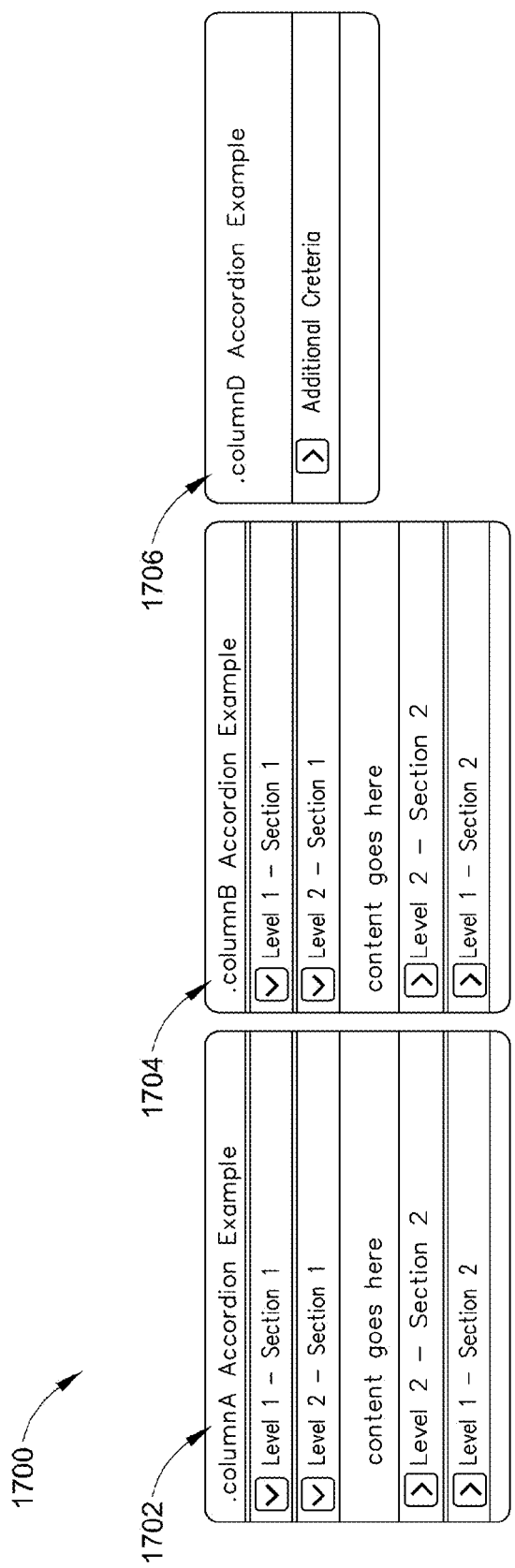
FIG. 17 shows example section styles.

FIG. 17 shows example section styles 1700, including columnA 1702, columnB 1704, and columnC 1706.

Table 14 illustrates an example implementation of the "section" styles.

TABLE 14

Example "Section" Styles

```
<div class="sectionTitle">
    <div class="toggleImageOpen" title="Hide Section" id="dgA1Img"
onclick="toggleSection('dgA1');"></div>
    <span>Level 1 - Section 1</span>
</div>
<div class="colWrapper" id="dgA1" style="display: block;">
    <div class="sectionTitle2">
        <div class="toggleImageOpen" title="Hide Section"
id="dgA1_1Img" onclick="toggleSection('dgA1_1');"></div>
        <span>Level 2 - Section 1</span>
    </div>
    <div class="colWrapper" id="dgA1_1" style="display: block;">
        <div class="listContainer"><ul><li>content goes
here</li></ul></div>
    </div>
</div>
```

Table 15 shows example Title Column Styles. Title Column Styles are used to group like controls in a form, displays bold text with a grey background.

TABLE 15

Title Column Styles

```
<div class="titleColumn">
    <p>Your title goes here</p>
</div>
```

Figure 18:
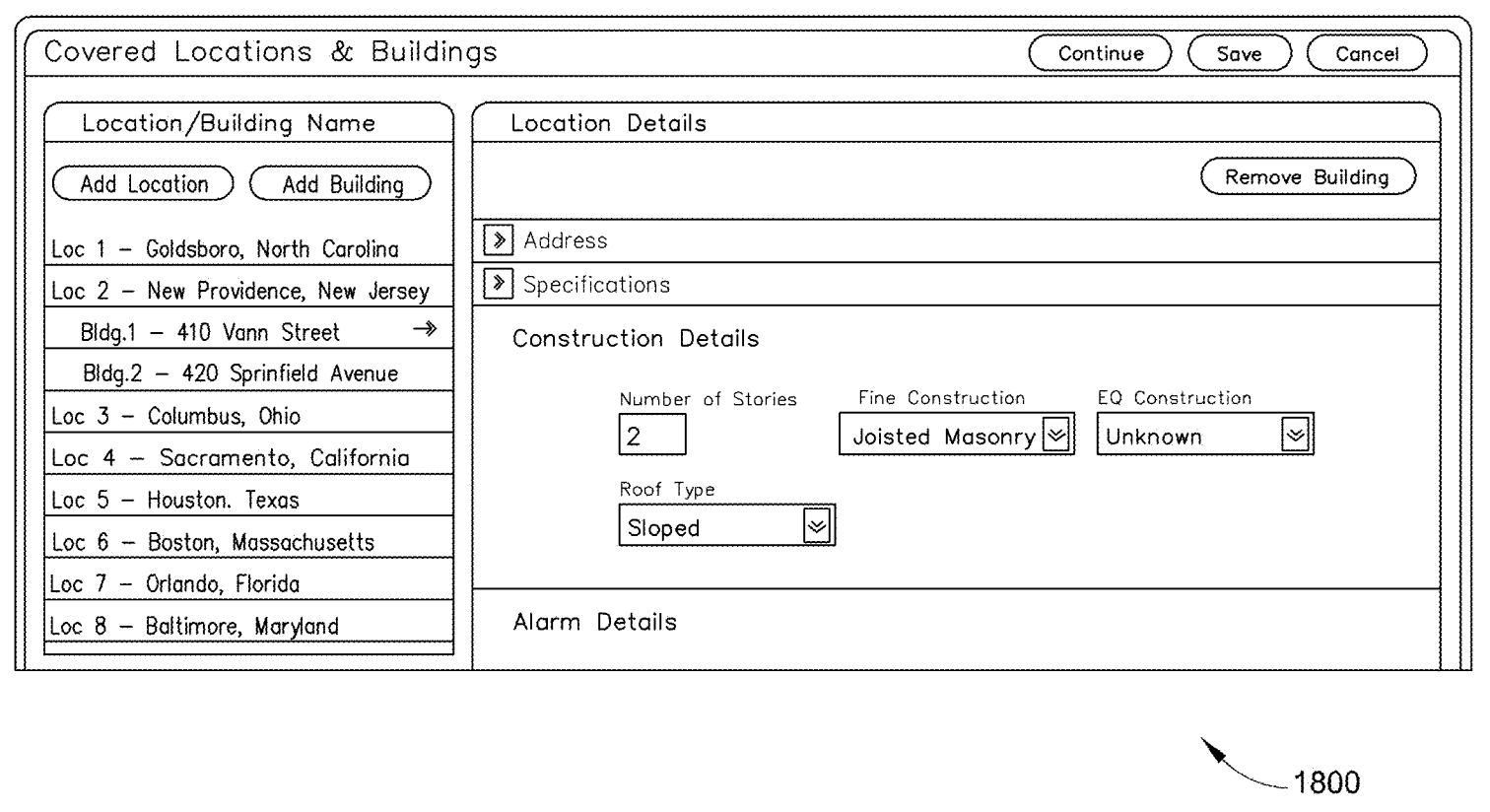

FIG. 18 illustrates a lateral list metaphor 1800. The lateral list metaphor is a small twist on the groupBox and sections look. The lateral list metaphor supports a single level of sections, and the primary color pattern, and uses the groupBoxColumnWrapper to create the look of a nested groupBox. Buttons logic include page level buttons, action buttons, section level buttons, and header buttons. Page level buttons may include .buttonBlueOnBlue, and .buttonBlueOnWhite. An action button example includes .buttonOrangeOnWhite. Section level buttons examples include .buttonGrayOnWhite, and .buttonGreyOnGray. Header buttons may include .helpButton, and .printButton. Buttons may be grouped together inside a DIV using various placement styles. The .buttonClear placement style may be used with the print and help buttons. The .buttonClear_topRight placement style may be used with the primary buttons in the group box title. The .buttonClear_bottomLeft placement style may be used for section level buttons, and the bottom right DIV should use "buttonClear_bottomRight w50" style pair. The .buttonClear_bottomRight placement style may be used with any type of button placed on the bottom right side of a group box.

FIG. 19 illustrates an example form 1900 used to layout controls on a page. Current styles allow for specifying the number of columns for each formLayout DIV. The form style .formLayout should be contained inside a DIV, and .twoColumn through .fiveColumn may be used to modify the formLayout styles to support different column layouts (class="formLayout threeColumn"). The .small style supports 1 column in the layout, .medium supports 2 columns in the layout .large supports 3 columns in the layout The .fullrow layout spans a complete row, and may be used with care because the .fullrow layout may break liquid layouts. The .pairedControl layout may be used with medium and large DIVS to allow multiple controls to be placed inside the same control DIV. HTML unordered lists are easily manipulated with CSS, and used for the menu, wizards, and lists of links.

Table 16 illustrates an example listContainer List Type. The listContainer is the main list type used in the ASW styles. The complete status indicates that the task is complete, the .selected status indicates the item was selected, the .label identifies the list item is a label.

TABLE 16

List Types - listContainer

```
<div class="listContainer">
<ul>
    <li class="complete">
        <div class="icon__item__completed"></div>
        <a href="#">Item 1 (.complete)</a>
    </li>
    <li class="selected"><a href="#">Item 2 (.selected)</a> </li>
    <li><a href="#"><a href="#">Item 3</a></li>
    <li class="label"><a href="#">Example Label (.label)</a></li>
    <li><a href="#"><a href="#">Item 4</a></li>
</ul>
</div>
```

Table 17 illustrates an example List Types—wizard. The List Types wizard uses nested unordered lists to create the wizard layout. The wizard layout styles exist for 2 to 6 steps in the wizard. The List Types wizard includes Step and Title. The Description is encouraged, but not required.

TABLE 17

List Types - wizard

```
<div class="wizard">
    <ul class="wizardNav">
        <li>
            <ul>
                <li class="step">(.step)</li>
                <li class="title selected">
                    <a href="#">(.title .selected)</a>
                </li>
```

TABLE 17-continued

List Types - wizard

```
                <li class="description">(.description)</li>
            </ul>
        </li>
        <li class="arrow"></li>
        <li>
            <ul>
                <li class="step">Step 2</li>
                <li class="title">
                    <a href="#"><verb> <noun> (.title)</a>
                </li>
                <li class="description">step 2 description</li>
            </ul>
        </li>
    </ul>
</div>
```

Figure 20:
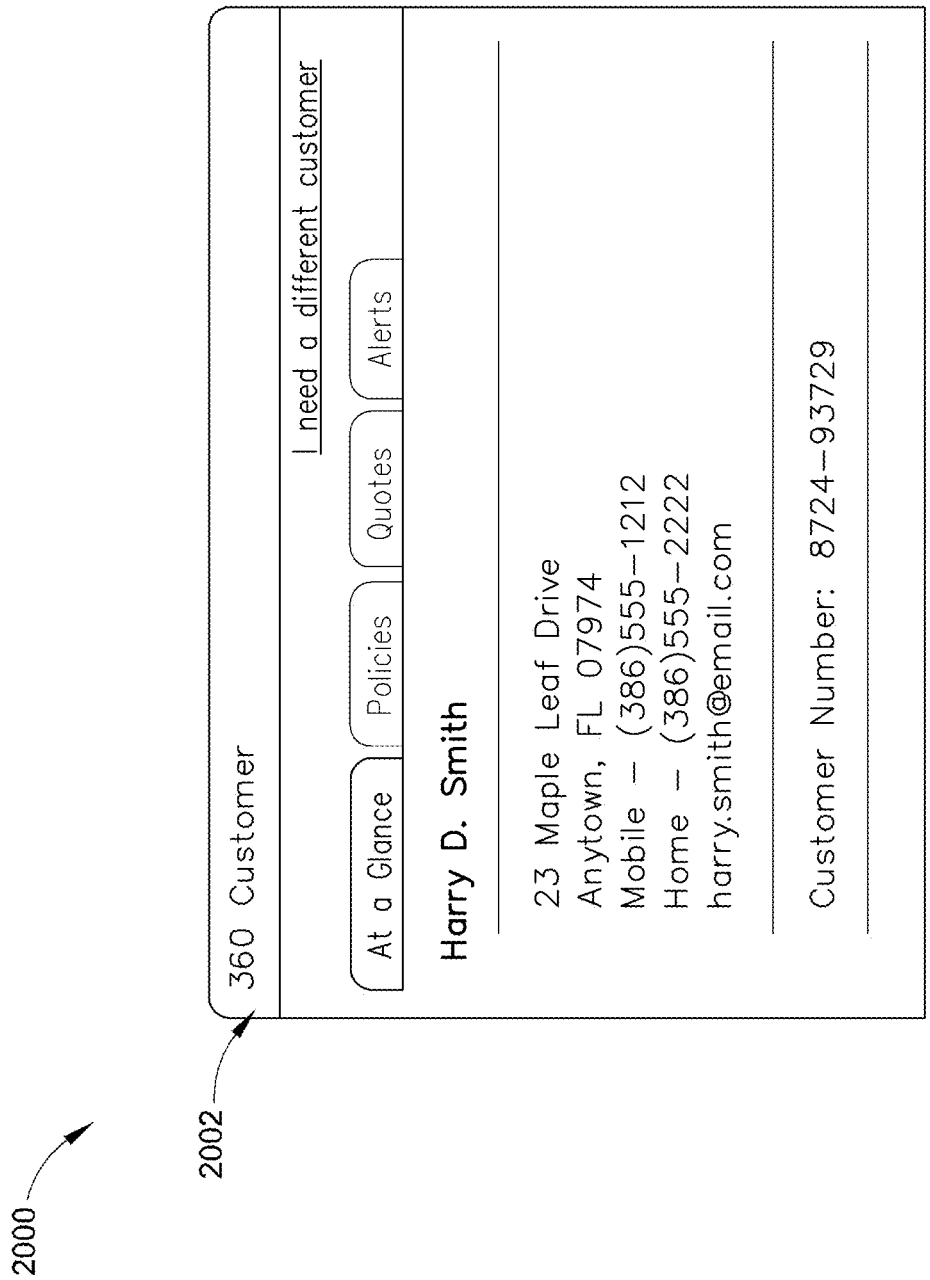
FIG. 20 illustrates a List Type-addressDetails.

FIG. 20 illustrates a List Type—addressDetails style 2000. The .addressDetails style may be used on the customer 360 groupBox 2002.

Table 18 illustrates an example implementation of the List Type—addressDetails style.

TABLE 18

List Type - addressDetails

```
<ul class="addressDetails">
    <li>
        Harry D. Smith
        <ul>
            <li>23 Maple Leaf Drive</li>
            <li>Anytown, FL 07974</li>
            <li>Mobile - (386)555 - 1212</li>
            <li>Home - (386)555 - 2222</li>
            <li>harry.smith@email.com</li>
        </ul>
        <ul>
            <li class="bottomBorder">
                Customer Number: 8724-93729
            </li>
        </ul>
    </li>
</ul>
```

Table 19 illustrates an HTML Tables style used to display information that needs to be organized in a multicolumn, multiple row layout. Tables should not be used for page layout. Telerik® RadGrid renders as an HTML table, and is styled to match the look of the ASW listTable.

TABLE 19

HTML Tables style

```
<table class="listTable" cellpadding="0" cellspacing="0" border="0">
    <tr>
        <th width="15%"><div>ID</div></th>
        <th width="85%"><div>Description</div></th>
    </tr>
    <tr>
        <td>12305</td>
        <td>text goes here</td>
    </tr>
</table>
```

FIG. 21 illustrates a TABLE.listTable style 2100. The listTable style is the primary look for content tables, used with table headers (TH), and Rows (TR) that have roll-over and selected row treatments. The listTable style supports table sub-headers and collapsible row treatment.

FIG. 22 illustrates a TABLE style 2200. The standard table is used on the Search Preview 2202, and the shadedRow treatment does not change on roll-over.

Table 20 illustrates an example TABLE style.

TABLE 20

TABLE style

```
<table width="95%" align="center" border="0" cellpadding="0"
cellspacing="4px" summary="">
<tr>
    <td colspan="2"><br><strong>Field Information</strong></td>
</tr>
<tr>
    <td width="30%" class="normal">Data Type</td>
    <td width="70%" class="shadedRow">Valid Value</td>
</tr>
<tr>
    <td class="normal">Description</td>
    <td class="shadedRow">This field indicates that towing is covered
under the policy.</td>
</tr>
</table>
```

The Table.actionTable style is used on the Claim Tree and other locations where menus are needed. The actionTable and the shadedRow treatment change on roll-over.

Figure 23:
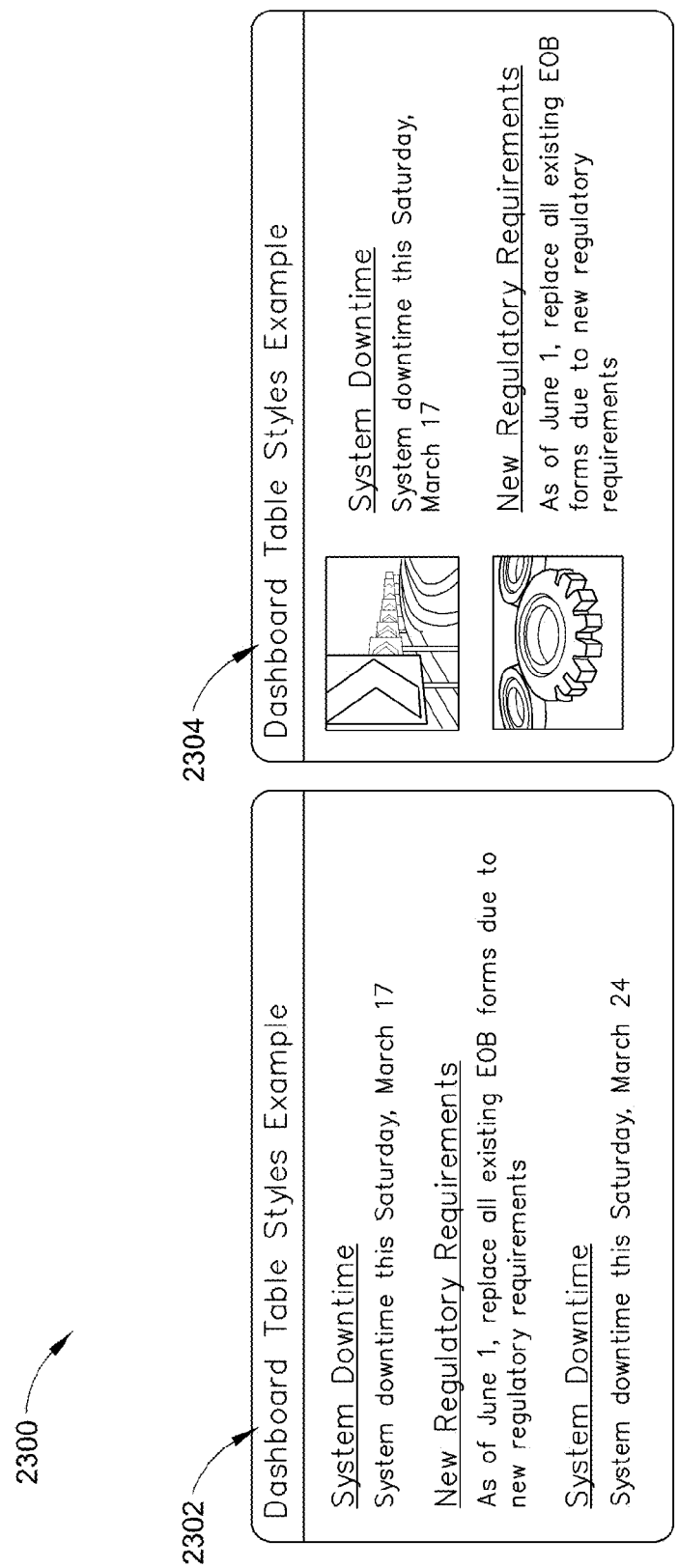
FIG. 23 illustrates a TABLE.dashboardTable style.

FIG. 23 illustrates an example TABLE.dashboardTable style 2302. The dashboard table is used on the dashboard 2304.

Table 21 illustrates example logic to implement the TABLE.dashboardTable style.

TABLE 21

TABLE.dashboardTable style

```
<table class="dashboardTable" align="center" border="0"
cellpadding="0" cellspacing="0"
summary="" width="97%">
    <tr class="oddRow">
        <td align="center"><a href="#"><div
class="icon_rules1"></div></a></td>
        <td>
            <p class="title"><a href="#">System Downtime</a></p>
            System downtime this Saturday, March 17
        </td>
    </tr>
    <tr class="evenRow">
        <td align="center"><a href="#"><div
class="icon_rules2"></div></div></a></td>
        <td>
            <p class="title"><a href="#">New Regulatory
Requirements </a></p>
            As of June 1, replace all existing EOB forms due to new
regulatory requirements
        </td>
    </tr>
</table>
```

Table 22 illustrates an example implementation of the TABLE.plainTable style. The plainTable is used for a simple label/value layout.

TABLE 22

TABLE.plainTable style

```
<table class="plainTable" cellpadding="3px" cellspacing="0" border="0"
width="100%" summary="" >
    <tr>
        <td width="40%" class="fieldLabel">Policy Number</td>
        <td width="60%">C91_172_A102</td>
    </tr>
```

TABLE 22-continued

TABLE.plainTable style

```
    <tr>
        <td class="fieldLabel">Policy Status</td>
        <td>INFORCE</td>
    </tr>
</table>
```

Table 23 illustrates example implementation logic for a Basic RadGrid.

TABLE 23

Basic RadGrid

```
<asp:XmlDataSource ID="XmlDataSource1" runat="server"
DataFile="xml/basicGridData.xml"/>
<telerik:RadGrid ID="basicGrid" DataSourceID="basicGridData"
runat="server">
    <MasterTableView DataKeyNames="id" runat="server"
GridLines="None">
        <Columns>
            <telerik:GridBoundColumn UniqueName="id"
DataField="id" HeaderText="ID" HeaderButtonType="None"
                ItemStyle-Width="15%" HeaderStyle-
Width="15%">
            </telerik:GridBoundColumn>
            <telerik:GridBoundColumn UniqueName="name"
DataField="name" HeaderText="Name"
                HeaderButtonType="None" ItemStyle-
Width="35%" HeaderStyle-Width="35%">
            </telerik:GridBoundColumn>
            <telerik:GridBoundColumn UniqueName="required"
DataField="required" HeaderText="Required"
                ItemStyle-Width="12%" HeaderStyle-Width="12%"
HeaderButtonType="None">
            </telerik:GridBoundColumn>
            <telerik:GridTemplateColumn HeaderText="Product"
HeaderButtonType="None" UniqueName="product">
                <ItemTemplate>
                    <div class="threeline">
                        <asp:Label ID="product"
Text='<%#Bind("product") %>' runat="server"></asp:Label>
                    </div>
                    <telerik:RadToolTip ID="RadToolTip1"
runat="server" TargetControlID="product">
                        <%#DataBinder.Eval(Container,
"DataItem.product") %>
                    </telerik:RadToolTip>
                </ItemTemplate>
            </telerik:GridTemplateColumn>
        </Columns>
    </MasterTableView>
</telerik:RadGrid>
```

The form layout system includes four themes (e.g., BlueBerry, Cucumber, Grape, and Tomato). The default theme is set in the web.config file. Themes are changed dynamically by changing the Page.Theme setting. Custom themes may be placed under the App_Themes folder.

Figure 24:
FIG. 24 illustrates a list of section layout styles.

FIG. 24 illustrates a list of section layout styles 2400 and descriptions 2402.

FIG. 25 illustrates a list of form layouts 2500 and descriptions 2502.

Figure 26:
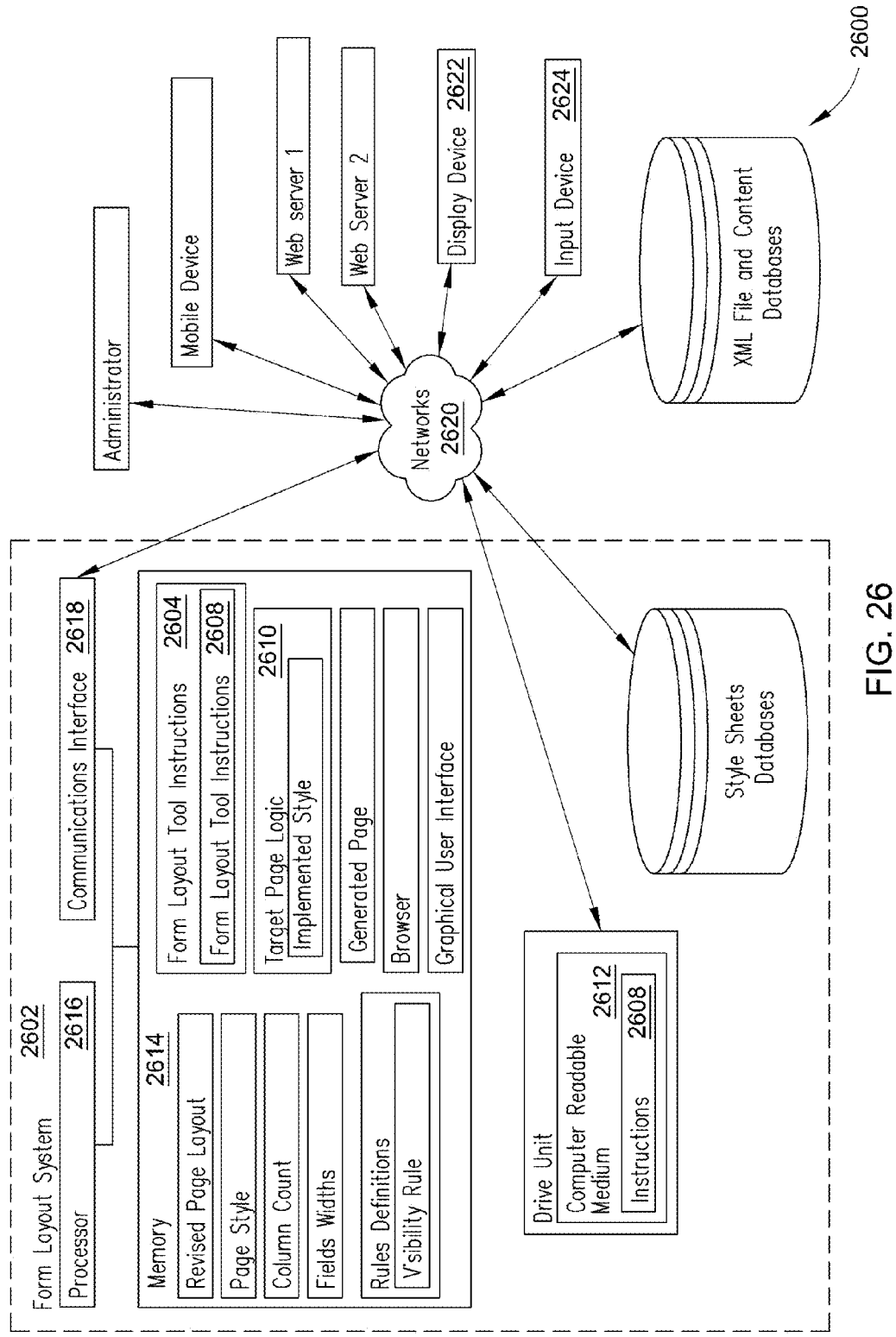
FIG. 26 illustrates an example system diagram.

FIG. 26 shows a block diagram of a form layout system 2602 configuration 2600 that may implement the form layout tool 2604 with a graphical user interface display 2606. Any of the logic described above may be implemented in the system 2602 (e.g., the form layout tool instructions 2608 and target application logic 2610) and may be encoded or stored in a machine-readable or computer-readable medium 2612 such as a compact disc read only memory (CDROM), magnetic or optical disk, flash memory, random access memory (RAM) 2614 or read only memory (ROM), erasable programmable read only memory (EPROM) or other machine-readable medium as, for examples, instructions for execution by a processor 2616, controller, or other processing device. In the course of executing the form layout tool, the processor 2616 generates a revised layout. The machine-readable medium may be implemented as any device or tangible component that contains, stores, communicates 2618, propagates, or transports 2620 executable instructions 2608 for use by or in connection with an instruction executable system 2602, apparatus, or device 2622, 2624. Alternatively or additionally, the instructions and logic 2608, 2610 may be implemented as analog or digital logic using hardware, such as one or more integrated circuits, or one or more processors executing instructions, or in software in an application programming interface (API) or in a Dynamic Link Library (DLL), functions available in a shared memory or defined as local or remote procedure calls, or as a combination of hardware and software.

Figure 27:
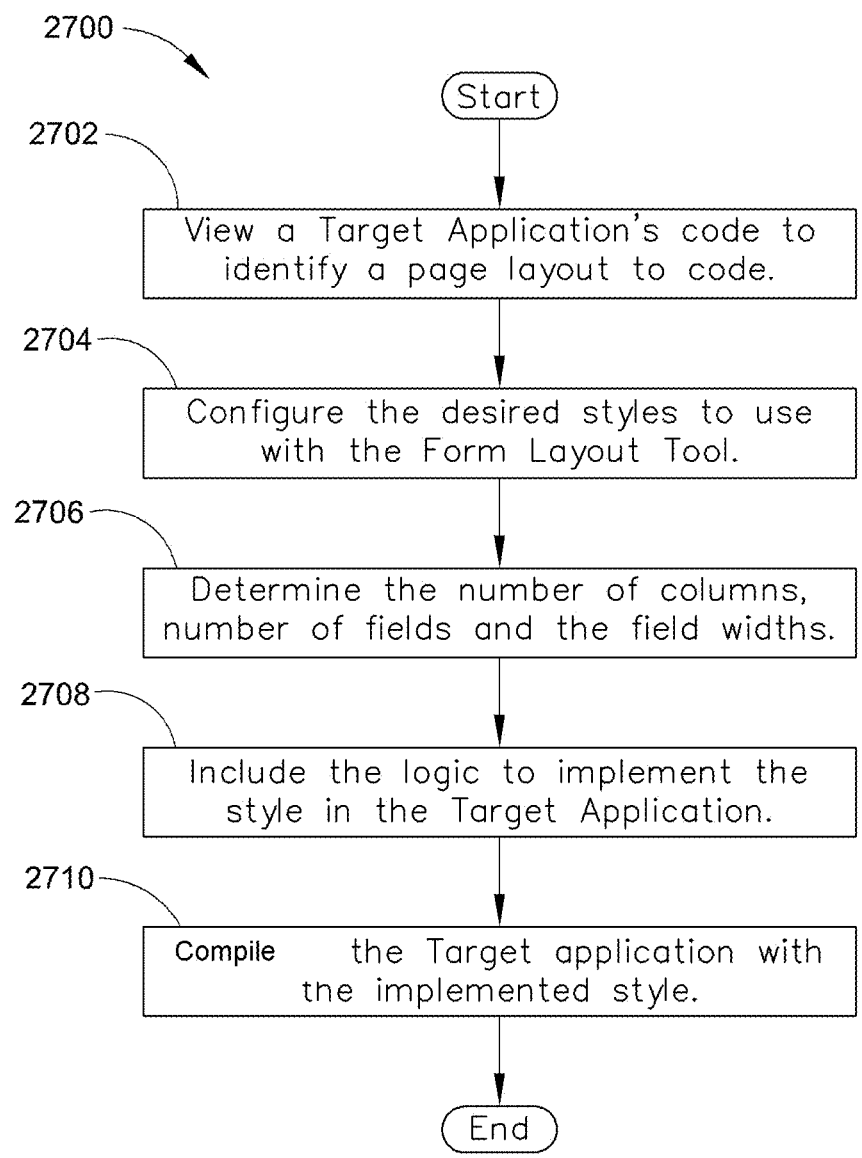
FIG. 27 illustrates of the form creation logic.

FIG. 27 illustrates of the form creation logic 2700. The user uses the form layout tool to view the target application intended to receive form layout changes (2702). The form layout tool is configured to use various form layout styles available to the developer either from in-house development or a third party. The form layout tool configures a web configuration file with the location of the form layout styles (2704). The user specifies a number of columns, a number of fields, and a "size" of each field to include in the component of the page layout (2706). Using the form layout tool the user includes the logic to implement the style in the target application (2708), and compiles the application to use the implemented style (2710).

Using cascading style sheets for web sites externalizes the style sheets so that style sheets can be shared across applications yet provides the mechanisms that allow theming and application level customizations. The method and system uses DIVs to layout the form. Each field is in its own DIV in the order the developer want the field to appear on the page. The fields stack themselves into rows depending on column type requested for the form. Developers no longer need to place fields into rows on the page. By specifying the field size and number of columns for the form, the fields automatically arrange themselves into rows. The method and system simplifies the complexity of web form layout, and saves significant development time. The method and system allows a user to use Styles to change the form layout due to client requirements to language text length needs. For example, where a website is offered in English and German, the form layout may be changed advantageously from '3 column' in English to '2 column' in German to accommodate the longer text length in the language. Anyone with access to a web site using this innovation would be able to view the style sheets (CSS). Understanding the style sheets requires some training in the technology. These styles are closely tied to the HTML coding patterns needed to take advantage of the styles. It would be reasonably difficult to use the CSS to figure out the HTML coding patterns that must be followed for Multilayer Style Sheet Approach to work. The combination of the form layout styles and HTML coding patterns greatly simplifies the construction of web forms. Any web application or web site could use this innovation. It has been developed to be technology independent. The sites built using these innovations are supported on all current browsers. The requirement for a flexible style sheet driven approach to form layout came from the application teams.

A division (DIV) is an html convention that is basically the binding rectangle for anything that goes on the page and names for the classes. The styles relate to column A which is the left hand column, column B which is the main site, column C which is a third column on the page for a three column layout. The styles are very specific to the way the pages are constructed, and within the style sheets, the style sheets are very specific as to the styles that may be used on a page. The form layout tool uses several different layouts. For example, a user web site typically uses application specific styles, but the developer decides that across the board to make all of column Bs for a particular theme purple rather than blue. Accordingly, a specific set of styles related to column B exists that overwrite the images and any specific colors related to that style.

The master styles are for the applications, and include all standard style masters. An application may include some master styles that include a theme style and web configuration and the application master level includes styles for the header logo, an application logo image, application master style would overwrite that application logo image with the proper image for the application. The image files (e.g., icons and buttons) are not directly referenced so that the images related to icons in specific style sheets may be changed to appear more seamless with the rest of the applications. The form layout tool provides single column, two column, and three column layouts. A one column layout may use 20%, and a three column layout includes 20%, 50%, 20%. Two column layouts include 20% on the left, 80% on the right, and another two column layout includes 30% and 70%. Dashboards use a three column layout where the columns may be evenly spaced. A user may use the application's master style sheet to implement a change across the board. The form layout tool may discourage users from implementing a layout that is inconsistent with the rest of the applications. A style guide indicates how a page needs to look (e.g., the html coding patterns needed to implement the style). The form layout tool provides the coding patterns to allow developers to build the page quickly and accurately, because the developer does not have to know anything about designing the table. Many developers try to lay out a page with a series of nested tables, which really becomes a maintenance burden. Using divisions (DIVs) to lay out the page, by changing the percentages of the widths of the divs causes the columns to be recalculated to fit within the specified area without a need for other code changes.

Application and client specific styles are put together with the different layers of customization. Most applications build a style sheet for the application. The form layout tool works across multiple platforms including ASP sites, JSP, fusion, as long as the HTML, and the styles may be used across the board. The styles and cutting patterns used with the form layout tool support a very broad range of web browsers. The standard problems that developers usually face are eliminated. For example, because of the flexibility of the styles, the costs incurred to implement a change across browsers do not get incurred on a per application basis.

A form layout division is used to control the form layout from two to five columns of information within the form. Form layout is one of the areas where developers traditionally have used nested tables to create the layout. Using nested tables to create the layout is very problematic and prone to errors and really tough to debug. Each of the controls on the page is placed inside of a division that is identified as a small, medium or a large. A small division is for one column, a medium division is for two columns and a large division is for three columns in width. By overriding the style specific to the number of columns how wide the small, medium or large shows up is influenced. The styles are layered out in the page, and depending on the widths of the fields, the fields float into proper position on the page. For example, if four smalls (fields) are intended for a three column layout, then the result would be three on one row and a fourth on a second row.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof. The system may operate using IIS version 7, Internet Explorer version 8, and Visual Studio 2008.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer system comprising:
   a computer memory operable to store form layout tool instructions;
   a database operable to store a plurality of form layout styles; and
   a processor in communication with the memory and the database, by executing the form layout tool instructions the processor is operable to:
      receive a target application identifier, wherein the target application comprises a plurality of application pages comprising data fields located thereon;
      configure a web configuration file with the location of the form layout styles;
      create a page layout for the target application from the plurality of application pages, using a form layout style from the plurality of form layout styles, receiving layout parameters to include on the page layout, and determining a combination of pre-determined field sizes to the data fields based on a number of columns on the page layout;
      generate, using the form layout tool instructions, a revised application page with the created page layout by applying the form layout style from the plurality of form layout styles as specified by the created page layout, and applying the combination of the pre-determined field sizes according to the number of columns on the page layout; and
      execute the target application with the created page layout.

2. The system of claim 1, where the layout parameters comprise:
   a number of columns;
   a number of fields; and
   a "size" of each field.

3. The system of claim 1, where the system receives a subset of form layout styles of the plurality of form layout styles from a third party.

4. The system of claim 1, where the form layout style from the plurality of form layout styles identifies a code pattern to use to implement the form layout style.

5. The computer system of claim 1, wherein the form layout tool instructions comprise a cascading style sheet that is shared across a plurality of applications.

6. The computer system of claim 5, wherein the cascading style sheet contains a style that applies across multiple pages so that a consistent look among the plurality of applications is enabled.

7. The computer system of claim 6, wherein the cascading style sheet is changed to overwrite the application pages.

8. The computer system of claim 1, wherein the processor is operable to generate the revised application with the created page layout by utilizing a division (DIV) to conduct a tableless design, and dynamically assembling the application page according to a class of the DIV.

9. The computer system of claim 1, wherein the form layout style comprises a master style for the plurality of application pages to indicate a page look for the plurality of application pages, and a page change is rejected when the page change is inconsistent with the page look.

10. A method for generating a form on page displayed on a display device, the method comprising:
    storing form layout tool instructions in a computer memory;

storing in a database form layout styles; and executing the form layout tool instructions with a processor, the instructions configured to cause the processor to:

receive a target application identifier, wherein the target application comprises a plurality of application pages comprising data fields located thereon;

configure a web configuration file with the location of the form layout styles;

create a page layout for the target application from the plurality of application pages, using a form layout style from the plurality of form layout styles, receiving layout parameters to include on the page layout, and determining a combination of pre-determined field sizes to the data fields based on a number of columns on the page layout;

generate a revised application page with the created page layout by applying the form layout style from the plurality of form layout styles as specified by the created page layout, and applying the combination of the pre-determined field sizes according to the number of columns on the page layout;

execute the target application with the created page layout.

11. The method of claim 10, where the layout parameters comprise:

a number of columns;

a number of fields; and a "size" of each field.

12. The method of claim 10, further comprising receiving a subset of form layout styles of the plurality of form layout styles from a third party.

13. The method of claim 10, where the form layout style from the plurality of form layout styles identifies a code pattern to use to implement the form layout style.

14. The method of claim 10, wherein the form layout tool instructions comprise a cascading style sheet that is shared across applications.

15. The computer system of claim 14, wherein the cascading style sheet contains a style that applies across multiple pages so that a consistent look among the plurality of applications is enabled.

16. The computer system of claim 15, wherein the cascading style sheet is changed to overwrite the application pages.

* * * * *